(12) United States Patent
Long et al.

(10) Patent No.: US 12,071,214 B2
(45) Date of Patent: Aug. 27, 2024

(54) SELF-ORIENTING SUCTION POINT FOR FLUID TRANSPORTATION

(71) Applicant: The Government of the United States of America, as represented by the Secretary of Homeland Security, Washington, DC (US)

(72) Inventors: Liam Long, Washington, DC (US); Christian Burzycki, Washington, DC (US); Glen Armstrong, Washington, DC (US); Joseph Camean, Old Lyme, CT (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/209,672

(22) Filed: Jun. 14, 2023

(65) Prior Publication Data
US 2023/0406472 A1    Dec. 21, 2023

Related U.S. Application Data

(60) Provisional application No. 63/352,440, filed on Jun. 15, 2022.

(51) Int. Cl.
*B63H 21/38*   (2006.01)
*F16K 17/36*   (2006.01)
*F01M 11/00*   (2006.01)

(52) U.S. Cl.
CPC ......... *B63H 21/386* (2013.01); *F16K 17/363* (2013.01); *F01M 2011/0075* (2013.01); *Y10T 137/0923* (2015.04)

(58) Field of Classification Search
CPC ............ B60G 17/01925; B63H 21/386; F01M 2011/0041; F01M 2011/0075;
(Continued)

(56) References Cited

U.S. PATENT DOCUMENTS 241,313 A * 5/1881 De Kinder .............. F16K 17/36
137/45
1,382,532 A * 6/1921 Newton .................. G01F 23/02
33/391
(Continued)

*Primary Examiner* — Kenneth Rinehart
*Assistant Examiner* — Jonathan J Waddy
(74) *Attorney, Agent, or Firm* — Lavanya Ratnam; Robert W. Busby

(57) ABSTRACT

A fluid transportation apparatus includes a first suction pipe having a first intake opening and a second suction pipe having a second intake opening. The first and second suction pipes are attached to a vessel on opposite sides to move in rolling motion. The first intake opening is disposed in a fluid reservoir at a position lower than the second intake opening and a valve device moves toward a maximally opened position for a first proximal end of the first suction pipe and to move toward a maximally closed position for a second proximal end of the second suction pipe, as the first and second suction pipes move with the vessel in a first rolling direction of the rolling motion. The intake openings reverse roles and the proximal ends reverse roles, as the vessel moves in a second rolling direction of the rolling motion opposite from the first rolling direction.

24 Claims, 12 Drawing Sheets

(58) Field of Classification Search
CPC ........ F16K 17/363; F16N 13/22; F16N 25/04; Y10T 137/0801; Y10T 137/0923
USPC ....... 137/45, 565.37, 606, 607, 625.42, 872, 137/876, 38, 40, 43, 44; 184/6.28, 6.5, 184/30, 34, 35, 44, 45, 73; 220/230.2; 251/315.06, 315.13; 440/88 L
See application file for complete search history.

(56) References Cited

U.S. PATENT DOCUMENTS

| | | | | | |
|---|---|---|---|---|---|
| 1,687,185 | A | * | 10/1928 | Tipton | B61K 3/02 184/44 |
| 1,710,163 | A | * | 4/1929 | Hartney | A62C 13/74 169/72 |
| 1,866,280 | A | * | 7/1932 | Woolson | F01M 11/065 184/6.2 |
| 2,022,898 | A | * | 12/1935 | Niven | F16N 9/04 184/6.2 |
| 2,184,969 | A | * | 12/1939 | Allen | B61K 3/02 239/173 |
| 2,226,193 | A | * | 12/1940 | Barrett | B60P 1/162 280/43.23 |
| 2,740,563 | A | * | 4/1956 | Jackson | F16L 27/08 244/135 R |
| 3,719,352 | A | * | 3/1973 | Harrison et al. | F02M 5/02 261/DIG. 50 |
| 4,023,548 | A | * | 5/1977 | Prasch | F01M 11/065 123/196 CP |
| 4,103,665 | A | * | 8/1978 | Prasch | F01M 11/065 123/196 R |
| 4,915,130 | A | * | 4/1990 | Dowler | F16L 27/093 137/590 |
| 5,106,120 | A | * | 4/1992 | Di Maria | B60G 21/0555 137/625.23 |
| 5,655,714 | A | * | 8/1997 | Kieffer | B05B 7/2402 239/340 |
| 6,260,534 | B1 | * | 7/2001 | Kampichler | F01M 11/03 123/196 R |
| 2004/0053546 | A1 | * | 3/2004 | Matsuda | B63H 21/386 440/88 L |
| 2009/0133757 | A1 | * | 5/2009 | Costin | F16K 17/36 137/45 |
| 2011/0056452 | A1 | * | 3/2011 | Horner | F01M 11/064 222/3 |
| 2017/0276037 | A1 | * | 9/2017 | Youm | F01M 11/0004 |
| 2021/0277812 | A1 | * | 9/2021 | Smith | F01M 11/02 |

* cited by examiner

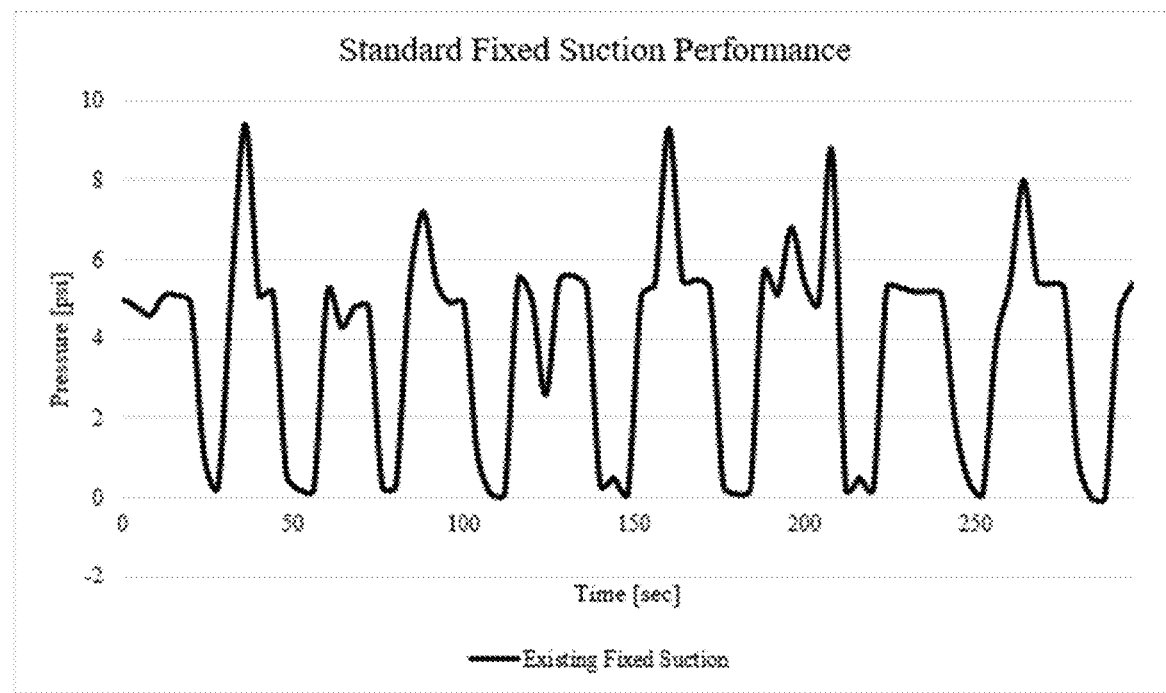
(A)
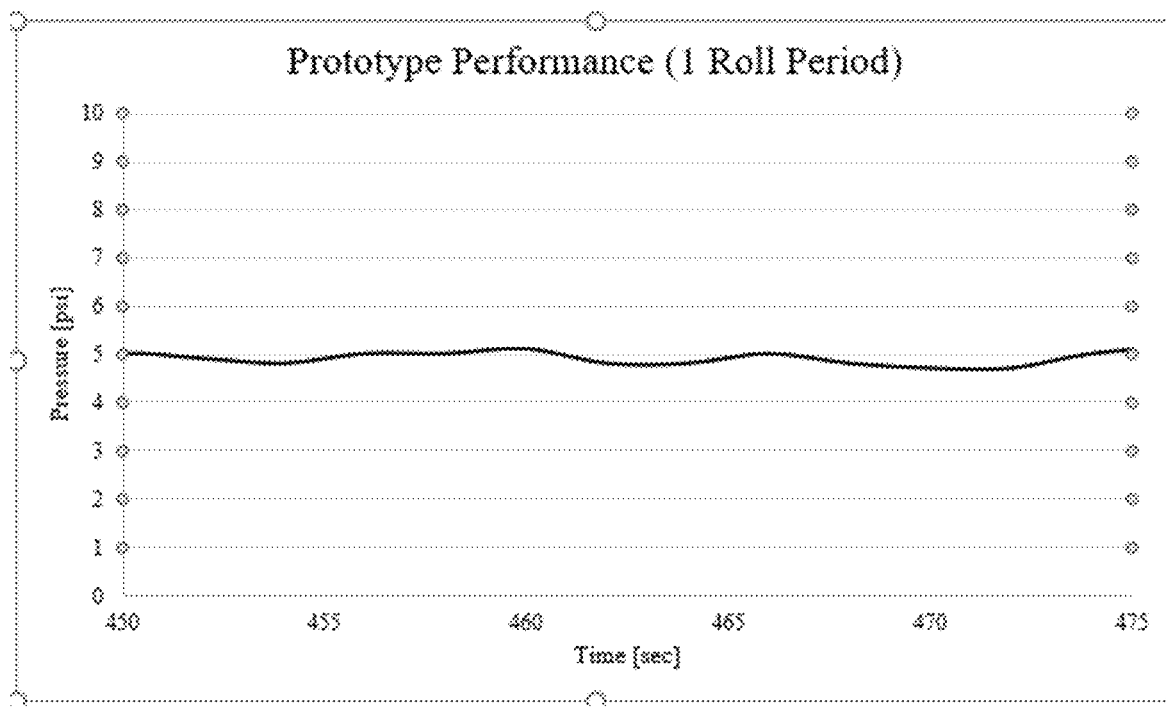
(B)
FIG. 10

SELF-ORIENTING SUCTION POINT FOR FLUID TRANSPORTATION

CROSS-REFERENCE TO RELATED APPLICATIONS

The application claims the benefit of priority from and is a non-provisional of U.S. Provisional Patent Application No. 63/352,440, filed on Jun. 15, 2022, entitled SELF-ORIENTING SUCTION POINT FOR FLUID TRANSPORTATION, the disclosure of which is incorporated by reference in its entirety.

SUMMARY STATEMENT OF GOVERNMENT INTEREST

The present invention was made with support by employees of DHS in the performance of their official duties. The U.S. Government has certain rights in this invention.

FIELD

The discussion below relates generally to fluid transportation and, more specifically, to the transportation of fluid in a system designed to reduce the loss of the fluid pressure.

BACKGROUND

Many large two stroke marine diesel engines have a similar lubrication system layout. Oil drains from the engine's crank case into an external sump located beneath the engine. Oil pumps then draw suction from fixed suction points in the sump. The oil pumps then discharge to filters and sea water cooled coolers. After being filtered and cooled, the oil reenters the engine to cool and lubricate engine components. Engine manufacturers, including WinGD and MAN B&W, generally only rate these lubrication systems as capable of sustaining the Code of Federal Regulations (CFR) minimums of inclination but no further.

Marine gas turbines either use a dry sump or wet sump lubrication system to cool and lubricate the rotating machinery within the turbine. Dry sumps lubrication systems use a scavenge pump to extract oil from a shallow sump below the turbine to store it in an external reservoir before it is pumped from the reservoir through the rest of the system and back to the engine. Dry sumps are most common in marine gas turbines and wet sumps are more common in aircraft application. The dry sump lubrication system in popular marine gas turbines, such as the GE LM2500 gas turbine, are very reliable and do not have major concerns for main propulsion losses.

The International Maritime Organization (IMO) and marine classification societies such as the American Bureau of Shipping (ABS) are responsible for creating and enforcing maritime safety regulations. The IMO publishes international shipping regulations in response to marine casualties, new technologies, or other updates while some countries publish their own specific regulations for shipping in their countries. Several regulations directly relating to machinery lubrication systems are essential to consider. The CFR specifies that vessels must maintain propulsion up to 15° static list and 22.5° average dynamic roll while the ABS (American Bureau of Shipping) adds that emergency power installation of liquified natural gas carriers must remain operable with 30° inclination. Lastly, the ABS requires alarms for unacceptable inclination angles and loss of lube oil pressure alarms that automatically shut off engines to prevent damage. The U.S. Coast Guard's Office of Investigations and Casualty Analysis (CG-INV) has thousands of documented cases of main propulsion loss due to machinery failure in heavy sea states. Cases such as the SS EL FARO cargo ship losing propulsion in a hurricane due to a loss of lube oil pressure have led to the loss of many lives.

SUMMARY

Embodiments of the present invention are directed to apparatus and methods for preventing or, at a minimum, reducing the loss of lube oil pressure. Some embodiments provide engineering solutions for a retrofit lubrication system to tolerate large inclination angles. In one example, the engineered solution leads to a successful lubrication system operation at 30° static list and 45° average dynamic roll, while tolerating a fore and aft pitch of 7.5°. Such a retrofit lubrication system with increased capabilities exceeds the requirements for updating the CFR standards for all mariners. The current CFR requires ocean going vessels to maintain propulsion at 15° static list and 22.5° average dynamic roll and 7.5° fore and aft pitch. The design can be implemented in building a practical lubrication system or retrofitting existing marine propulsion machinery which requires vessels to sustain larger rolls. By allowing the main propulsion system to withstand 30° static list and 45° average dynamic roll, the lubrication system can endure inclination angles of double the current CFR legal minimums by exploring various options for oil tanks and sumps, piping, suction points, and pumps.

In accordance with an aspect, a fluid transportation apparatus for a vessel to move in rolling motion comprises: a container configured to contain a fluid reservoir of a fluid; a first suction pipe having a first proximal end and a first distal end, the first distal end having a first intake opening configured to be submersible in the fluid reservoir in the container to take in the fluid and transport the fluid through the suction pipe out through the first proximal end; and a second suction pipe having a second proximal end and a second distal end, the second distal end having a second intake opening configured to be submersible in the fluid reservoir in the container to take in the fluid and transport the fluid through the second suction pipe out through the second proximal end. The first suction pipe and the second suction pipe are attached to the vessel on opposite sides of the rolling motion to move with the vessel in rolling motion. The first intake opening is disposed in the fluid reservoir at a position lower than the second intake opening as the first suction pipe and the second suction pipe move with the vessel in a first rolling direction of the rolling motion. The second intake opening is disposed in the fluid reservoir at a position lower than the first intake opening as the first suction pipe and the second suction pipe move with the vessel in a second rolling direction of the rolling motion opposite from the first rolling direction. A valve device is coupled to the first proximal end of the first suction pipe and the second proximal end of the second suction pipe. The valve device is configured to move toward a maximally opened position for the first proximal end of the first suction pipe and to move toward a maximally closed position for the second proximal end of the second suction pipe as the first suction pipe and the second suction pipe move with the vessel in the first rolling direction of the rolling motion. The valve device is configured to move toward a maximally opened position for the second proximal end of the second suction pipe and to move toward a maximally closed position for the first proximal end of the first suction pipe as the first suction pipe and the second suction pipe move with the vessel in the second rolling direction of the rolling motion.

In specific embodiments, a first one-way valve is coupled with the first distal end of the first suction pipe to allow one-way flow from the first distal end to the first proximal end, and a second one-way valve is coupled with the second distal end of the second suction pipe to allow one-way flow from the second distal end to the second proximal end.

Another aspect is directed to a fluid transportation method for a vessel moving in rolling motion. The fluid transportation method comprises: attaching a first suction pipe to the vessel to move with the vessel in rolling motion, the first suction pipe having a first proximal end and a first distal end, the first distal end having a first intake opening configured to be submersible in a fluid reservoir of fluid in a container to take in the fluid and transport the fluid through the suction pipe out through the first proximal end; and attaching a second suction pipe to the vessel to move with the vessel in rolling motion, the second suction pipe having a second proximal end and a second distal end, the second distal end having a second intake opening configured to be submersible in the fluid reservoir in the container to take in the fluid and transport the fluid through the second suction pipe out through the second proximal end. The first suction pipe and the second suction pipe are attached to the vessel on opposite sides of the rolling motion to move with the vessel in rolling motion. The first intake opening is disposed in the fluid reservoir at a position lower than the second intake opening as the first suction pipe and the second suction pipe move with the vessel in a first rolling direction of the rolling motion. The second intake opening is disposed in the fluid reservoir at a position lower than the first intake opening as the first suction pipe and the second suction pipe move with the vessel in a second rolling direction of the rolling motion opposite from the first rolling direction. The method further comprises coupling a valve device to the first proximal end of the first suction pipe and the second proximal end of the second suction pipe. The valve device moves toward a maximally opened position for the first proximal end of the first suction pipe and to move toward a maximally closed position for the second proximal end of the second suction pipe as the first suction pipe and the second suction pipe move with the vessel in the first rolling direction of the rolling motion. The valve device moves toward a maximally opened position for the second proximal end of the second suction pipe and moves toward a maximally closed position for the first proximal end of the first suction pipe as the first suction pipe and the second suction pipe move with the vessel in the second rolling direction of the rolling motion.

Yet another aspect is directed to a fluid transportation apparatus for a vessel to move in rolling motion. The fluid transportation apparatus comprises: a container configured to contain a fluid reservoir of a fluid; a first suction pipe having a first proximal end and a first distal end, the first distal end having a first intake opening configured to be submersible in the fluid reservoir in the container to take in the fluid and transport the fluid through the suction pipe out through the first proximal end; and a second suction pipe having a second proximal end and a second distal end, the second distal end having a second intake opening configured to be submersible in the fluid reservoir in the container to take in the fluid and transport the fluid through the second suction pipe out through the second proximal end. The first suction pipe and the second suction pipe are attached to the vessel on opposite sides of the rolling motion to move with the vessel in rolling motion. The first intake opening is disposed in the fluid reservoir at a position lower than the second intake opening as the first suction pipe and the second suction pipe move with the vessel in a first rolling direction of the rolling motion. The second intake opening is disposed in the fluid reservoir at a position lower than the first intake opening as the first suction pipe and the second suction pipe move with the vessel in a second rolling direction of the rolling motion opposite from the first rolling direction. The apparatus further comprises a mechanism or means for permitting fluid flow through the first proximal end of the first suction pipe and blocking fluid flow through the second proximal end of the second suction pipe as the first suction pipe and the second suction pipe move with the vessel in the first rolling direction of the rolling motion, and for permitting fluid flow through the second proximal end of the second suction pipe and blocking fluid flow through the first proximal end of the first suction pipe as the first suction pipe and the second suction pipe move with the vessel in the second rolling direction of the rolling motion.

In some embodiments, the means comprises: first valve means or mechanism coupled to the first suction pipe to move between a maximally opened position and a maximally closed position for the first suction pipe, for moving toward the maximally closed position for the first suction pipe as the first suction pipe and the second suction pipe move with the vessel in the second rolling direction of the rolling motion; and second valve means or mechanism coupled to the second suction pipe to move between a maximally opened position and a maximally closed position for the second suction pipe, for moving toward the maximally closed position for the second suction pipe as the first suction pipe and the second suction pipe move with the vessel in the first rolling direction of the rolling motion.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 10 shows (A) a graph of existing fixed sump performance during a roll cycle and (B) a graph of the pivoting suction prototype performance over a roll period.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

The design of the vessel lubrication system in this disclosure has at least some of the following design specifications. The lubrication system will have the ability to operate at static list angles up to 30°. The lubrication system will have the ability to operate at 45° average dynamic rolls. The lubrication will have an overhaul life of 32,000 hours or greater, an operational life of 64,000 hours or greater, a cost of installation of $500,000 or less, a lifetime ownership and maintenance cost of $1.5 million or less, an oil storage capacity of 1-1.5 kg of oil per kW of power produced by engine, and an oil circulation of 8.5-18 times per hour. The lubrication system will be able to deliver engine manufacturer's specified oil pressure, will require no human control during operation, and will be able to operate at temperatures between freezing and oil autoignition temperature. The lubrication system will reduce righting arm by less than 10%, will allow fewer than 1.5% insoluble, will allow less than 0.2% water introduction, will reduce usable engine room space less than 10%, will have less than double current system parts count, will maintain less than 10 parts per thousand of oil vapor in air, and has a mean time between failures of 96,000 hours.

Prototype testing shows the designed lubrication system can have the ability to operate at static list angles up to 30° and can have the ability to operate at 45° average dynamic rolls. The system can deliver the engine manufacturer's specified oil pressure and circulate the system's oil 8.5-18 times per hour, with less than double the current parts count.

The designs can be divided into two categories. The first category includes designs that will adjust where the lubrication oil pumps are drawing suction within the sump. The basic principle behind these designs is to ensure that the pumps are only drawing suction from the lower side of the sump. These designs include a gravity-actuated valve device, a swinging suction trunk, and electronically actuated valves. The second category of designs are intended to manage how oil will move within the sump in response to inclination. These designs include the addition of horizontal baffles and a rounding of the sump's corners. Some of these features can be combined.

Pivoting Suction Design Configuration

Figure 1:
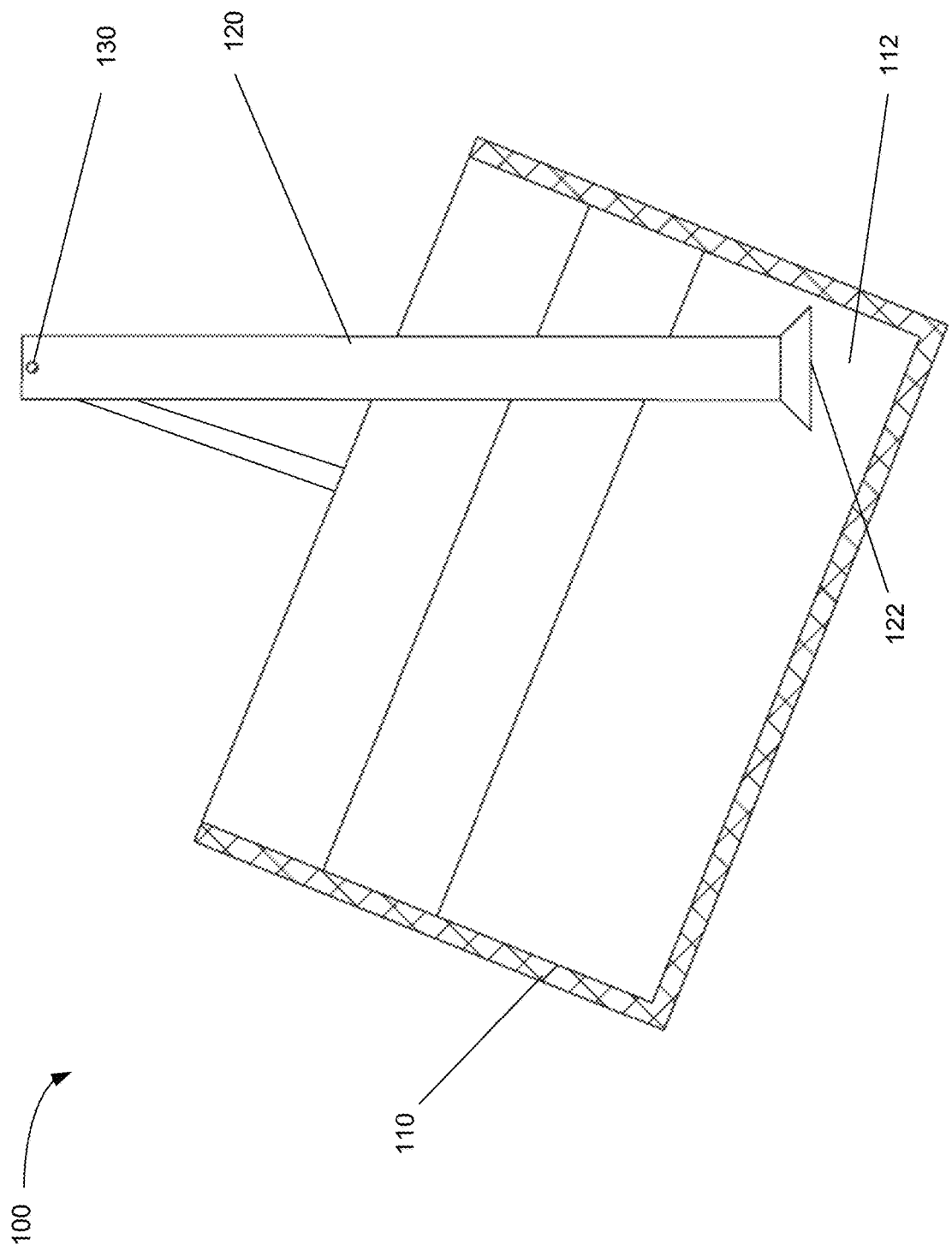
FIG. 1 is a schematic view of an example setup for simulating pivoting suction in a vessel.

FIG. 1 is a schematic view of an example setup 100 for simulating pivoting suction in a vessel. A swinging trunk 110 represents a sump having a reservoir 112 of oil for lubrication. A suction pipe 120 has a distal end with a suction point or an intake opening 122 submerged in the reservoir 112 and a proximal end rotatably coupled to the swinging trunk 110 via a pivot 130.

The pivoting suction design configuration 100 provides a single suction point that is able to move within the sump 110. By utilizing a rotary union at the pivot 130, the suction pipe 120 can be rigidly connected to the vessel and the lubrication pumps while allowing the distal end section of the pipe 120 to swing from side to side within the sump 110 and serve as the single suction point. When properly weighted and designed, the trunk 110 will remain nearly vertical with respect to gravity allowing the suction point 122 to remain submerged in the oil reservoir 112.

This design has one moving part, can be applied to several sump geometries, and is controlled by gravity. These characteristics aid in meeting the outlined engineering parameters. This design is considered safe because rotary unions have proven reliability in the commercial industry. Additionally, in the event that the rotary union were to seize, the suction point would remain submerged in sufficient oil levels of the oil reservoir 112.

In accordance with an aspect of simulating pivoting suction in a vessel, a fluid transportation apparatus for the vessel in rolling motion includes a container 110 and a suction pipe 120. The container contains a fluid reservoir 112 of a fluid and is rotatably connected to the vessel to pivot 130 relative to the vessel. The container pivots to maintain a level position without rolling with the vessel in rolling motion. The suction pipe has a proximal end and a distal end. The distal end has an intake opening 122 configured to be submerged in the fluid reservoir in the container to take in the fluid and transport the fluid through the suction pipe out through the proximal end. The suction pipe is attached to the vessel to roll with the vessel in rolling motion and to swing in rolling motion relative to the container in the level position with the intake opening at the distal end swinging in the container and changing position relative to the fluid reservoir.

Another aspect of simulating pivoting suction in a vessel is directed to a fluid transportation method for the vessel in rolling motion. The fluid transportation method comprises rotatably connecting a container 110 which contains a fluid reservoir 112 of a fluid to the vessel to pivot relative to the vessel. The container pivots to maintain a level position without rolling with the vessel in rolling motion. The fluid transportation method further comprises attaching a suction pipe 120 to the vessel to roll with the vessel in rolling motion. The suction pipe has a proximal end and a distal end. The distal end has an intake opening 122 submerged in the fluid reservoir in the container to take in the fluid and transport the fluid through the suction pipe out through the proximal end. The suction pipe rolls with the vessel in rolling motion to swing relative to the container in the level position with the intake opening at the distal end swinging in the container and changing position relative to the fluid reservoir.

According to another aspect, the container is attached to the vessel to move with the vessel in rolling motion. The suction pipe pivots to maintain a vertical position without rolling with the vessel in rolling motion. The intake opening of the distal end of the suction pipe is configured to be submerged in the fluid reservoir in the container to take in the fluid and transport the fluid through the suction pipe out through the proximal end. The suction pipe remains in the vertical position to swing in rolling motion relative to the container which moves with the vessel in rolling motion.

The pivoting suction design went through a few prototypes. The first prototype was a 3D printed pipe with threads that passed through a 1-inch bearing. This design worked but the sump tubing would influence the pivoting of the trunk. It was due to the return tube physically twisting as the pivot swung. The second prototype was designed to stop the influence of the sump tubing on the pivoting of the pipe. That design used a custom designed 3D printed rotary union like coupling. The rotary union used a non-sealed bearing, and the face of the bearing was a sealing surface. It created some issues with air being introduced to the system. Back pressure testing of the prototype revealed the sealing issues on the bearing surface and in some of the connections. Vaseline on the bearing face was used as a temporary fix, but a redesign was needed to seal properly. The third pivoting suction prototype was a pipe with a bellmouth suction pivoting on a sealed bearing acting as a rotary union to attach to the sump's piping to the return line. This prototype is almost completely sealed from air and the sealed bearing in the custom rotary union is the sealing surface. The only air, which is very little, that is introduced into the system is from the threads connected to the return piping.

Figure 2A:
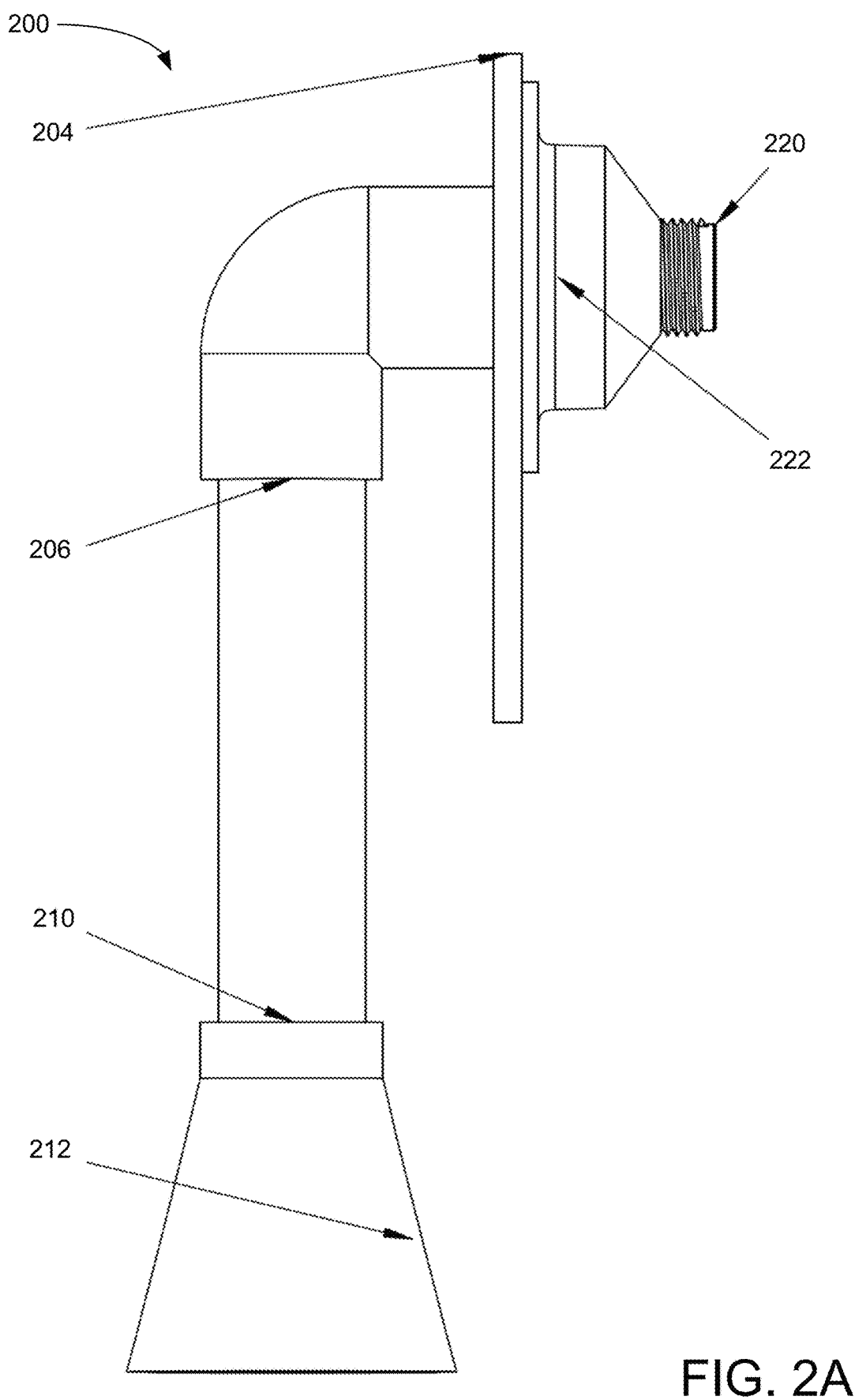
FIG. 2A is an elevational view illustrating a pivoting suction pipe according to an embodiment of the present invention.
Figure 2B:
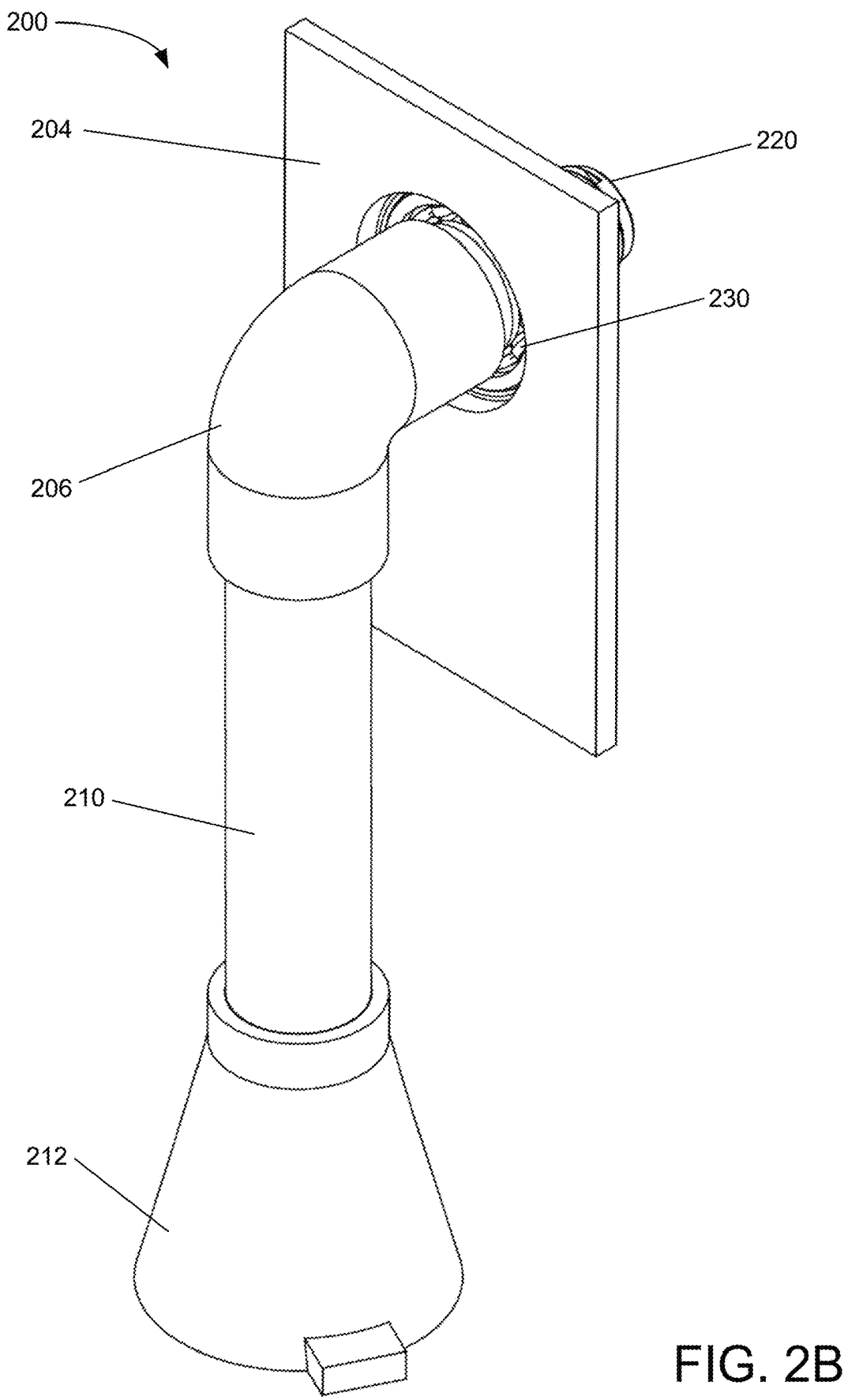
FIG. 2B is a perspective view thereof.

FIG. 2A is an elevational view illustrating a pivoting suction pipe according to an embodiment of the present invention. FIG. 2B is a perspective view thereof. A mounting plate 204 is disposed vertically for mounting an elbow 206 (e.g., PVC 90 female-female elbow) connected to the proximal end of a suction pipe 210 (e.g., PVC pipe) which may have a bellmouth nozzle 212 at the distal end. The elbow 206 is connected to a rotary union housing 220 via a rotary union adaptor 222 on the other side of the mounting plate 204.

The third pivoting suction prototype has proven functionality at 30° static list and 45° average dynamic roll. The design may utilize a sealed bearing 230. As described above, the sump piping in the first prototype influenced the actuation of the pivoting trunk. This was addressed in the second prototype by creating a rotary union with a bearing. The second prototype had trouble sealing with the non-sealed bearing. That observation led to the third prototype with the sealed bearing. The third prototype has proven the functionality of the design. That prototype had a total amount of run time around 1 hour in which very little air was introduced to the system and the system was able to maintain positive suction with a low lube oil level.

The pivoting suction prototype has proven functionality at the required sump angles of inclination. The prototype was constructed of PVC, 3D printed couplings, and a sealed bearing. The parts may be made of other materials such as metal and may utilize commercial off-the-shelf rotary union components to allow the suction pipe to pivot. For example, the piping (206, 210) may be made of steel and the rotary union (220, 222) may be constructed of carbon steel or stainless steel. The rotary union (220, 222) would be attached to a plate 204 above the sump allowing the sump pipe to pivot. A metal construction may provide better sealing for the system from air and provide a more realistic device for actual installation on a large marine diesel. The sealing may be done by welding all of the connections during assembly.

Gravity-Actuated Valve Device

Figure 3:
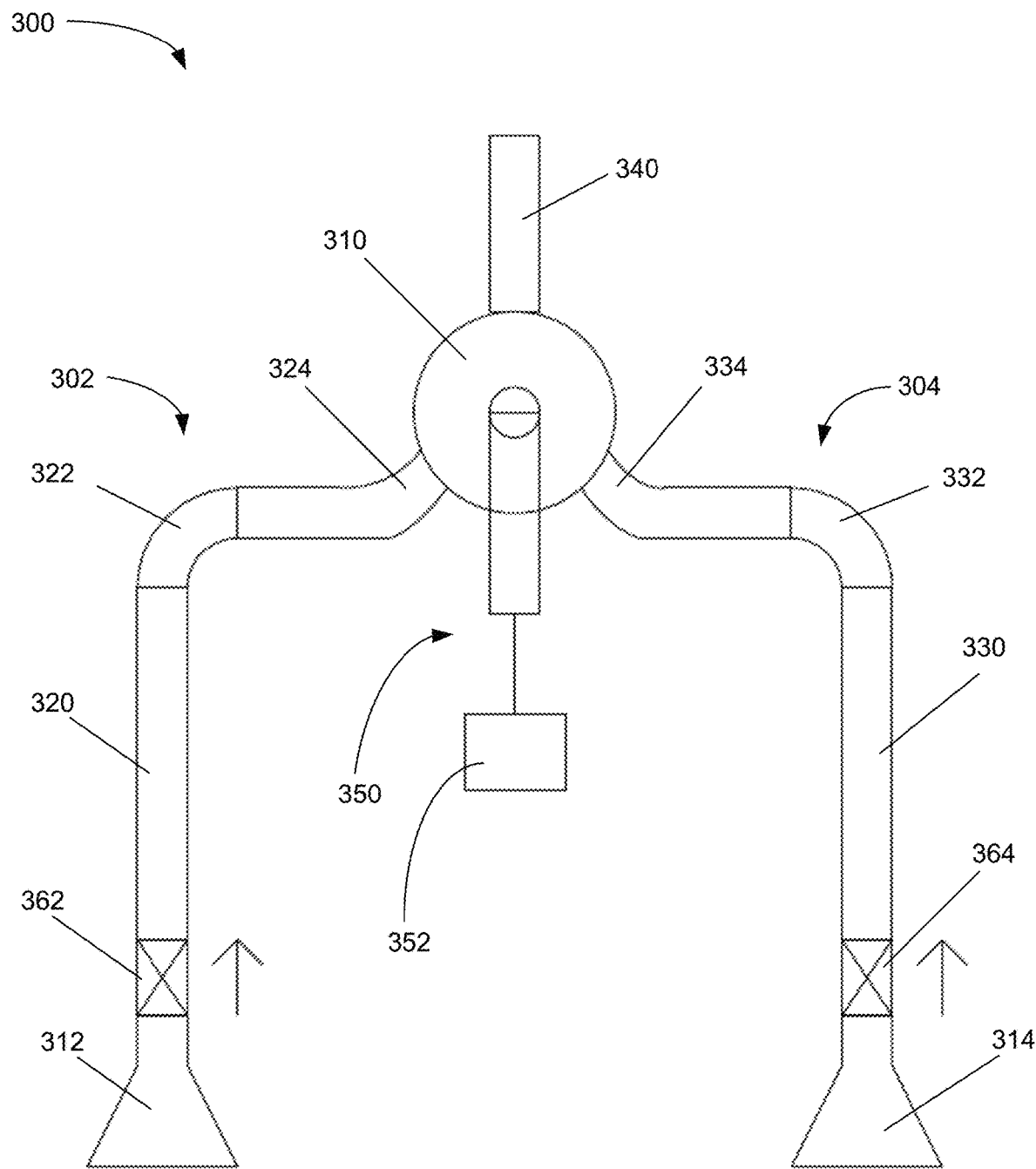
FIG. 3 is an elevational view illustrating an example of a gravity-actuated valve device.

FIG. 3 is an elevational view illustrating an example of a gravity-actuated valve device 300. It includes a first suction arm 302 and a second suction arm 304. The first suction arm 302 has a proximal end coupled to a valve device 310 and a first intake opening or bellmouth 312 at a distal end. The second suction arm 304 has a proximal end coupled to the valve device 310 and a second intake opening or bellmouth 314 at a distal end. In the example shown, the first suction arm 302 includes a first pipe 320 connected to a first elbow 322 to be coupled to a first inlet 324 of the valve device 310. The second suction arm 304 includes a second pipe 330 connected to a second elbow 332 to be coupled to a second inlet 334 of the valve device 310. In another embodiment, the first pipe 320 and first elbow 322 may be a first single pipe and the second pipe 330 and the second elbow 332 may be a second single pipe. The valve device 310 includes an outlet 340. The first suction arm 302 and the second suction arm 304 are mounted or attached to the vessel to roll with the vessel in rolling motion. A pendulum 350 having a weight 352 is used to gravity actuate the valve device 310 by pivoting relative to the vessel as it rolls. The container or sump may also be attached to the vessel to move with vessel in rolling motion, or it may pivot relative to the vessel to remain in a level position without rolling with the vessel.

The first intake opening 312 is disposed in the fluid reservoir at a position lower than the second intake opening 314 as the first suction pipe 302 and the second suction pipe 304 move with the vessel in a first rolling direction of the rolling motion. The second intake opening 314 is disposed in the fluid reservoir at a position lower than the first intake opening 312 as the first suction pipe 302 and the second suction pipe 304 move with the vessel in a second rolling direction of the rolling motion opposite from the first rolling direction.

The valve device 310 may be configured to move toward a maximally opened position for the first proximal end at the first elbow 322 of the first suction pipe 302 and to move toward a maximally closed position for the second proximal end at the second elbow 332 of the second suction pipe 304 as the first suction pipe 302 and the second suction pipe 304 move with the vessel in the first rolling direction of the rolling motion. The maximally opened position may be a fully opened position and the maximally closed position may be a fully closed position. The valve device 310 may be configured to move toward a maximally opened position for the second proximal end at the second elbow 332 of the second suction pipe 304 and to move toward a maximally closed position for the first proximal end at the first elbow 322 of the first suction pipe 302 as the first suction pipe 302 and the second suction pipe 304 move with the vessel in the second rolling direction of the rolling motion.

Figure 4:
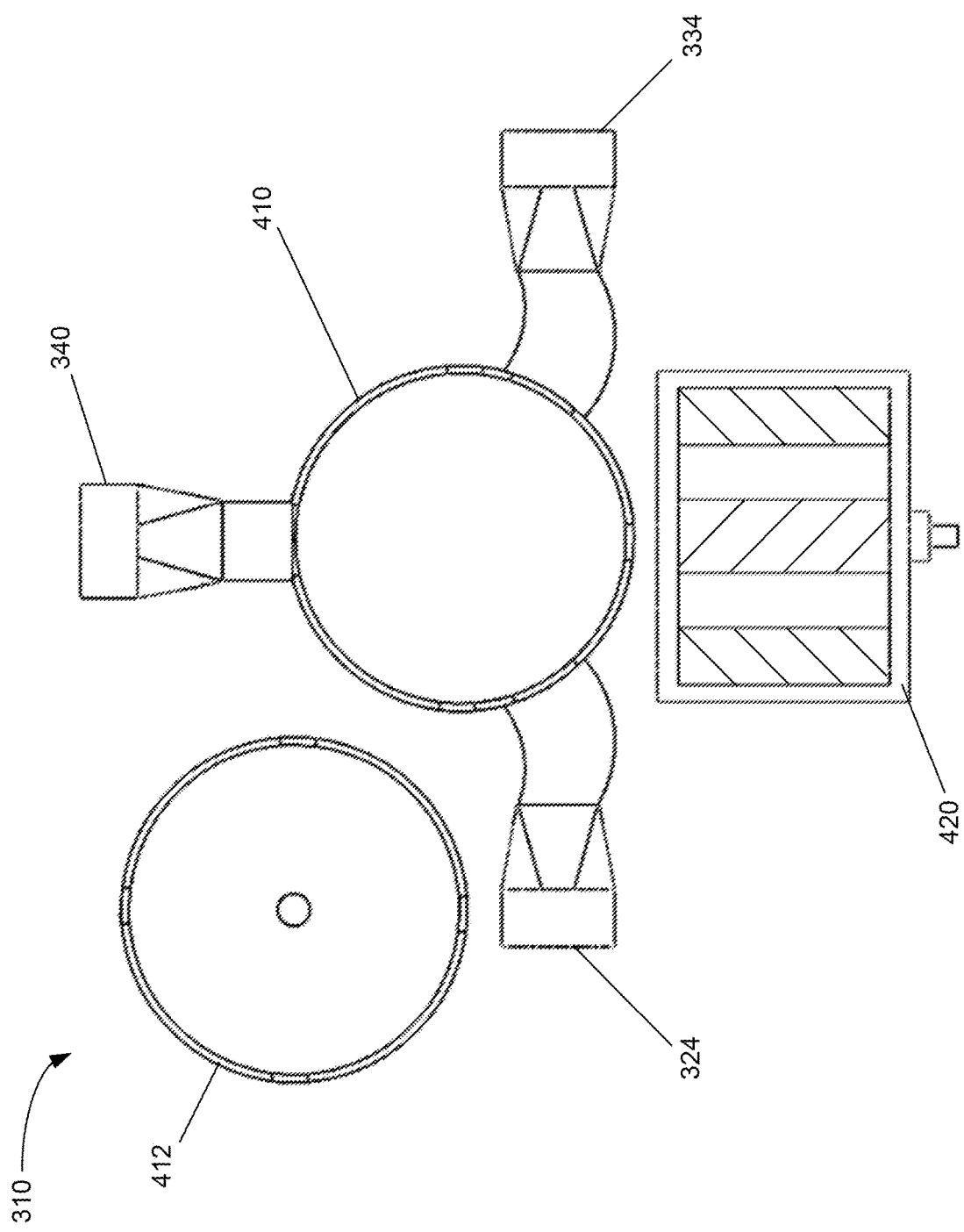
FIG. 4 shows a disassembled view of an example of the valve device of FIG. 3.

FIG. 4 shows a disassembled view of an example of the valve device 310 of FIG. 3. The first inlet 324, second inlet 334, and outlet 340 extend from respectively openings of a valve body 410 of the valve device 310. The valve housing or valve body 410 may be circular cylindrical in shape with a hollow interior and a cover 412. A valve member 420 (or valve disk trim) is inserted into the hollow interior of the valve body 410 as a center cage of the valve device 310. The weight 352 of the pendulum 350 is connected to the valve member 420 to keep it vertically oriented during rolling of the vessel. The pendulum 350 and the valve member 420 have a common center of rotation or pivot. The valve member 420 provides valving operation when the valve member 420 pivots relative to the valve body 410.

The valve member 420 is disposed inside the valve housing 410 and rotatable relative to the valve housing in the first rolling direction and the second rolling direction. The valve member 420 is connected to the pendulum weight 352 to maintain a bottom location (associated with a member 502 as seen in FIG. 5) of the valve member 420 at the lowest elevation of the valve member 420 when the valve housing 410 moves with the vessel in rolling motion.

Figure 5:
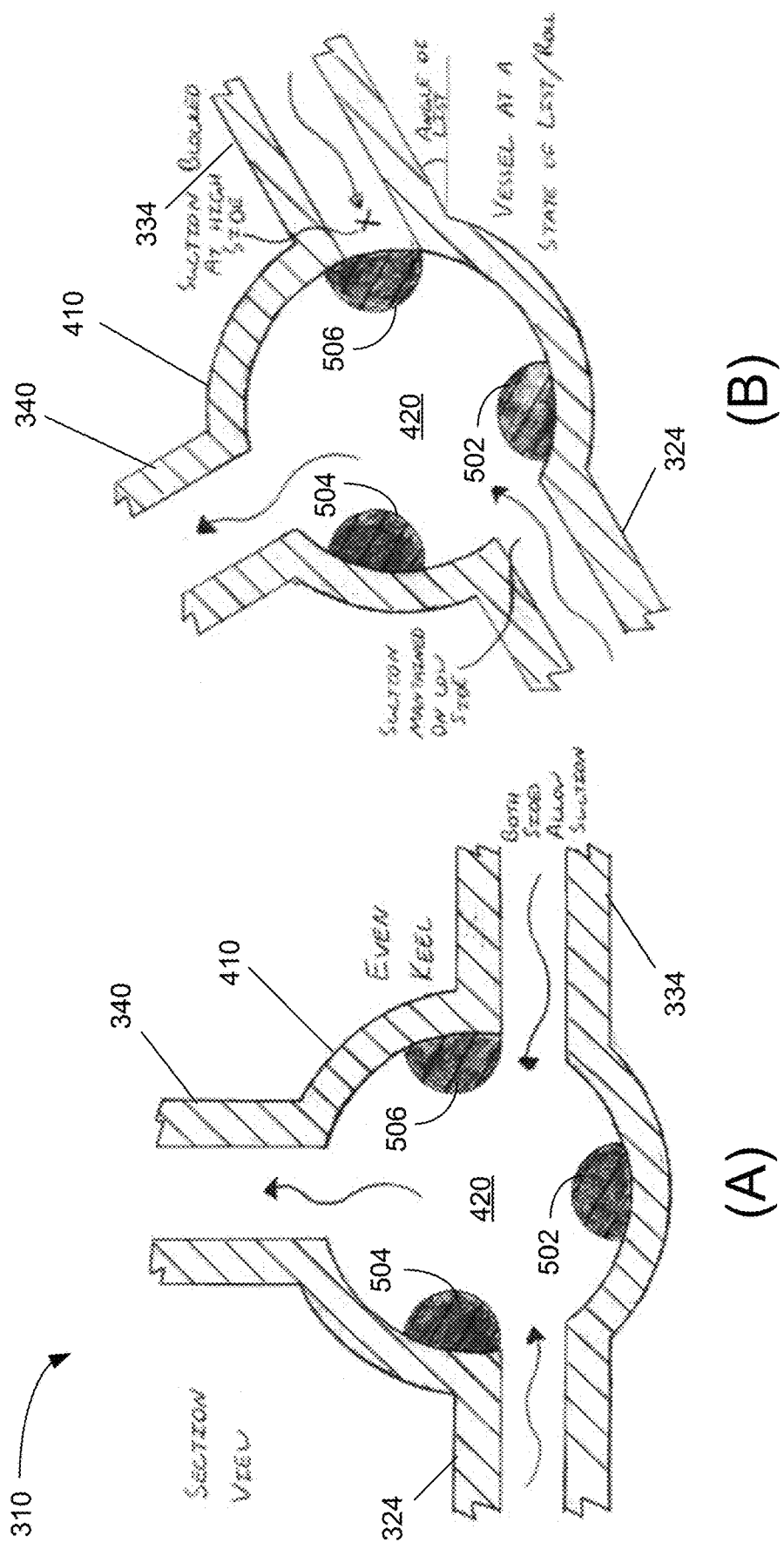
FIG. 5 is a cross-sectional view illustrating the valve member of the valve device (A) in a level position and (B) in a tilted position.

FIG. 5 is a cross-sectional view illustrating the valve member 420 of the valve device 310 (A) in a level position and (B) in a tilted position. The valve member 420 may include a first valve inlet blocking member 504 which moves relative to the valve housing 410 toward a first blocking position maximally blocking the first valve inlet 324 as the valve housing moves with the vessel in the second rolling direction of the rolling motion. The valve member 420 may include a second valve inlet blocking member 506 which moves relative to the valve housing 410 toward a second blocking position (see FIG. 5, view (B)) maximally blocking the second valve inlet 334 as the valve housing moves with the vessel in the first rolling direction of the rolling motion.

The valve member 420 is disposed in the circular cylindrical hollow interior of the valve housing 410 and has a circular cylindrical valve member body to rotate relative to the valve housing 410 in the first rolling direction and the second rolling direction. The first valve inlet blocking member 504 may be disposed along a periphery of the circular cylindrical valve member body and being sized to fully block the first valve inlet 324 in the first blocking position as the valve housing 410 moves with the vessel in the second rolling direction. The second valve inlet blocking member 506 may be disposed along the periphery of the circular cylindrical valve member body and being sized to fully block the second valve inlet 334 in the second blocking position as the valve housing moves with the vessel in the first rolling direction (see FIG. 5, view (B)).

In the embodiment shown in FIG. 5, the valve member 420 has three blocking/sealing part or blocking/sealing components 502, 504, 506 circumferentially spaced relative to each other. The weight 352 of the pendulum 350 is connected to the valve member 420 and remains vertical with respect to gravity during rolling of the vessel. The pendulum 350 and the valve member 420 remain vertical while the valve body 410 moves in rolling motion with the vessel and causes component 504 or 506 to seal one inlet 324 or 344. In the level position (A) of FIG. 5, the first inlet 324, second inlet 334, and outlet 340 are open and unobstructed. Both inlets 324, 334 allow suction of fluid into the interior of the valve body 410 where the valve member 420 is disposed. The fluid can flow out the outlet 340 without obstruction. In the tilted position (B) of FIG. 5, the valve body 410 which is stationary with respect to the vessel is tilted with the rolling of the vessel. Meanwhile, the valve member 420 is controlled by gravity and stays in the gravity-controlled vertically oriented position as in the level position (A) and does not tilt with the rolling of the vessel. As such, the valve member 420 pivots relative to the valve body 410 and the vessel. As seen in position (B) of FIG. 5, the sealing part 506 is aligned with the second inlet 334 and blocks suction of fluid from the second inlet 334. Fluid suction occurs through the unobstructed first inlet 324 from the first arm 302. In this way, the device prevents suction of air via the second inlet 334 from the second arm 304 which has the 314 tilted high above the fluid (e.g., oil) reservoir.

The valve device 310 is a gravity-actuated three-way valve that is actuated by gravity as the vessel rolls. When installed, this valve device has two suction points (e.g., at the two bellmouths for first intake opening 312 and second intake opening 314), one at the port side of the sump and one at the starboard side. As the vessel rolls, the valve device 310 will secure suction to the higher side of the sump (e.g., at the second inlet 334 in FIG. 5(A)) while allowing suction on the lower side (e.g., at the first inlet 324 in FIG. 5(B)) where the oil would accumulate.

This design has few moving parts (e.g., the valve member 420 as a center cage and the weight 352 of the pendulum 350 connecting thereto), is controlled by gravity, and can work in a variety of sump geometries. The gravity-actuated valve device 310 is considered safe in the event of failure because one suction point would be maintained even if the valve device 310 were to seize.

The prototype gravity-actuated valve may be a 3D printed design made of four components. The valve body 410 acts as the housing and has two suction inlets 324, 334 and one discharge point 340 that is connected to the pump suction. The center cage 420 of the valve device is the moving mechanism that opens or closes a given suction point. The center cage 420 fits into the valve body 410 and has two sealing surfaces 504, 506, one intended to secure the port suction and one intended to secure the starboard suction. The top plate or cover 412 is an extension of the valve body 410 and allows the center cage 420 to be fitted inside the valve body 410. The final component is the pendulum 350, which is connected to the center cage 420 and is what rotates the center cage 420 as the sump rotates. When the sump is level, the valve device 310 allows suction from the first intake opening 312 and second intake opening 314. As the sump rotates, the valve device 310 begins to close the high side suction while further opening the low side suction. In one implementation, at an angle of 12°, the valve device 310 will fully secure the high side suction and only allow suction from the low side.

It has been shown that the gravity actuation does work. As the sump rotates, the pendulum 350 remains vertical and actuates the valve device 310. The gravity-actuated valve device 310 has shown an ability to maintain suction for short durations even when the high side suction point is no longer submerged in oil. This suction is eventually lost, however. It is hypothesized that an oil film lies between the center cage 420 and the valve body 410 and acts as a sealing surface. This oil film acts as a sealing surface that prevents air suction from occurring at the high side. As this oil film deteriorates, however, air is allowed into the valve device 310 and oil suction is eventually lost.

Oil draining from the high side suction piping may be solved by incorporating a first suction foot valve 362 above the first intake opening 312 and a second suction foot valve 364 above the second intake opening 314. Each suction foot valve is a one-way valve that allows the gravity-actuated valve device 310 to draw suction from the sump when intended. When the gravity-actuated valve device 310 secures suction to a side (e.g., first intake opening 312), however, the suction foot valve (e.g., second suction foot valve 364) will prevent the oil in the suction piping from draining back to the sump.

Electronically Actuated Valve Apparatus

Figure 6:
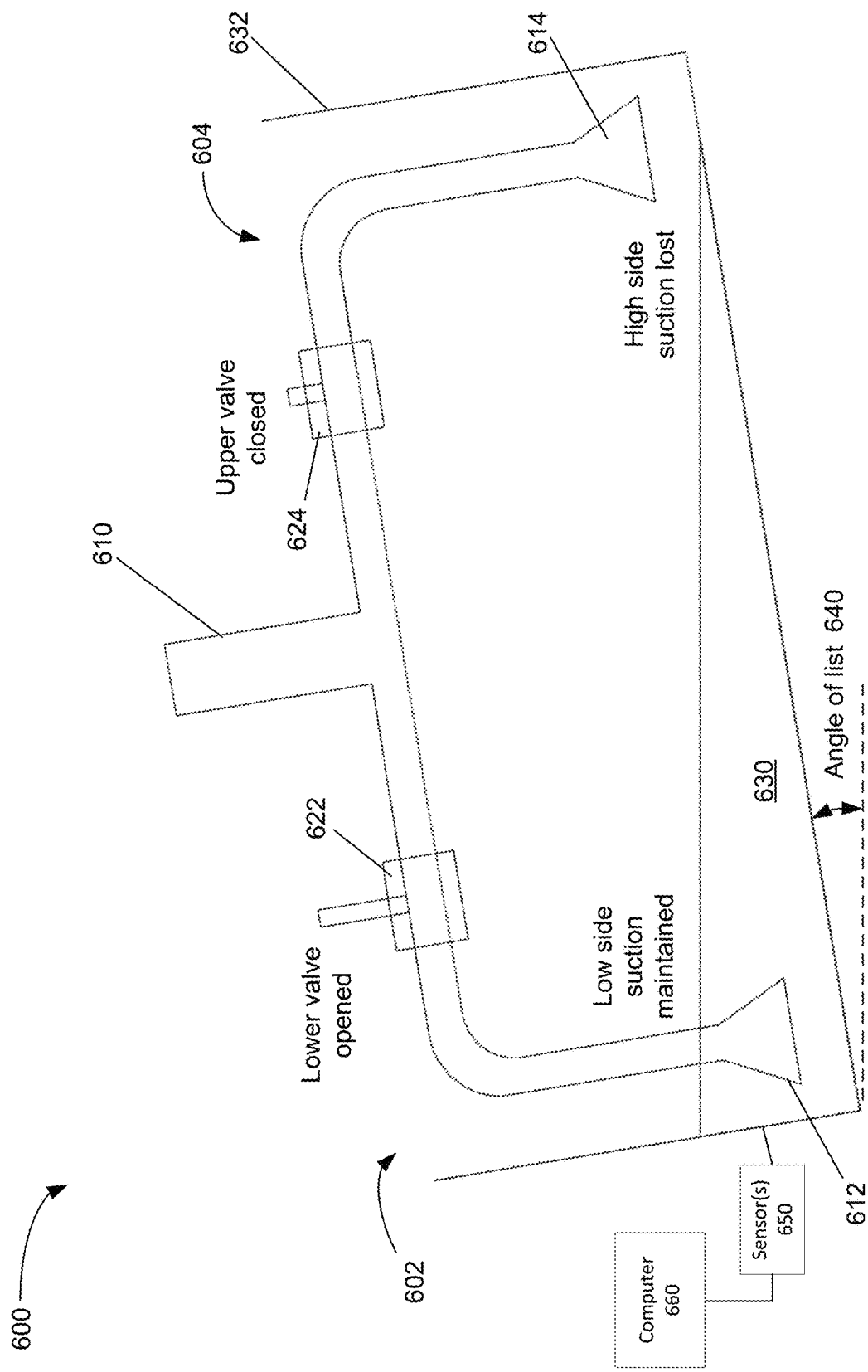
FIG. 6 is an elevational view schematically illustrating an example of an electronically actuated valve apparatus.

FIG. 6 is an elevational view schematically illustrating an example of an electronically actuated valve apparatus 600. It includes a first suction arm 602 and a second suction arm 604. The first suction arm 602 has a proximal end coupled to a discharge outlet 610 and a first inlet 612 which may be a bellmouth inlet 612 at a distal end. The second suction arm 604 has a proximal end coupled to the discharge outlet 610 and a second inlet 614 which may be a second bellmouth 614 at a distal end. The first suction arm 602 and the second suction arm 604 are attached to the vessel to move in rolling motion of the vessel.

A first electronically actuated valve 622 is disposed in the path of the first suction arm 602. The first electronically actuated valve 622 may be electronically actuated to move toward an opened position as the first suction pipe 602 and the second suction pipe 604 move with the vessel in the first rolling direction of the rolling motion. The first electronically actuated valve may be electronically actuated to move toward a closed position as the first suction pipe 602 and the second suction pipe 604 move with the vessel in the second rolling direction of the rolling motion.

A second electronically actuated valve 624 is disposed in the path of the second suction arm 604. The second electronically actuated valve 624 may be electronically actuated to move toward an opened position as the first suction pipe 602 and the second suction pipe 604 move with the vessel in the second rolling direction of the rolling motion. The second electronically actuated valve 624 may be electronically actuated to move toward a closed position as the first suction pipe 602 and the second suction pipe 604 move with the vessel in the first rolling direction of the rolling motion.

When the vessel is level, the electronically actuated valve apparatus 600 is at a level position where the first inlet 612 and the second inlet 614 are submerged in a reservoir of oil or the like. Both electronically actuated valves 622, 624 are opened to permit suction from both inlets 612, 614. When the vessel rolls as seen in FIG. 6, the lower first valve 622 is opened by electronic actuation to allow lower side suction from the first inlet 612 which is submerged in a reservoir 630 of fluid such as oil in a container or sump 632. The higher second valve 624 is closed by electronic actuation to prevent higher side suction from the second inlet 614 which is disposed above the fluid surface level of the reservoir 630. The electronic actuation may be controlled based on the angle of roll or list 640. The container or sump 632 may also be attached to the vessel to move with vessel in rolling motion, or it may pivot relative to the vessel to remain in a level position without rolling with the vessel.

This design may utilize sensors 650 such as fluid level sensors and/or inclination sensors to electronically control the valves 622, 624 that will allow or restrict suction. By sensing inclination or fluid level, a computer or controller 660 can determine where oil would be located within the sump. From this, the controller 660 can decide to draw suction from a port suction point 612 or starboard suction point 614. The controller 660 will then determine which valve to open and which to close to achieve proper fluid suction based on the suction point from which to draw suction.

The controller 660 may be configured to control electronic actuation of the first electronically actuated valve 622 to move between an opened position and a closed position based on first sensing information and to control the second electronically actuated valve 624 between an opened position and a closed position based on second sensing information. The first sensing information may include an angle of rolling motion and/or a fluid level of the fluid reservoir with respect to the first intake opening 612 of the first suction pipe 602. The second sensing information may include the angle of rolling motion and/or the fluid level of the fluid reservoir with respect to the second intake opening 614 of the second suction pipe 604. The fluid level sensors and/or inclination sensors 650 are used to obtain the first and second sensing information.

Horizontal Baffles

Figure 7:
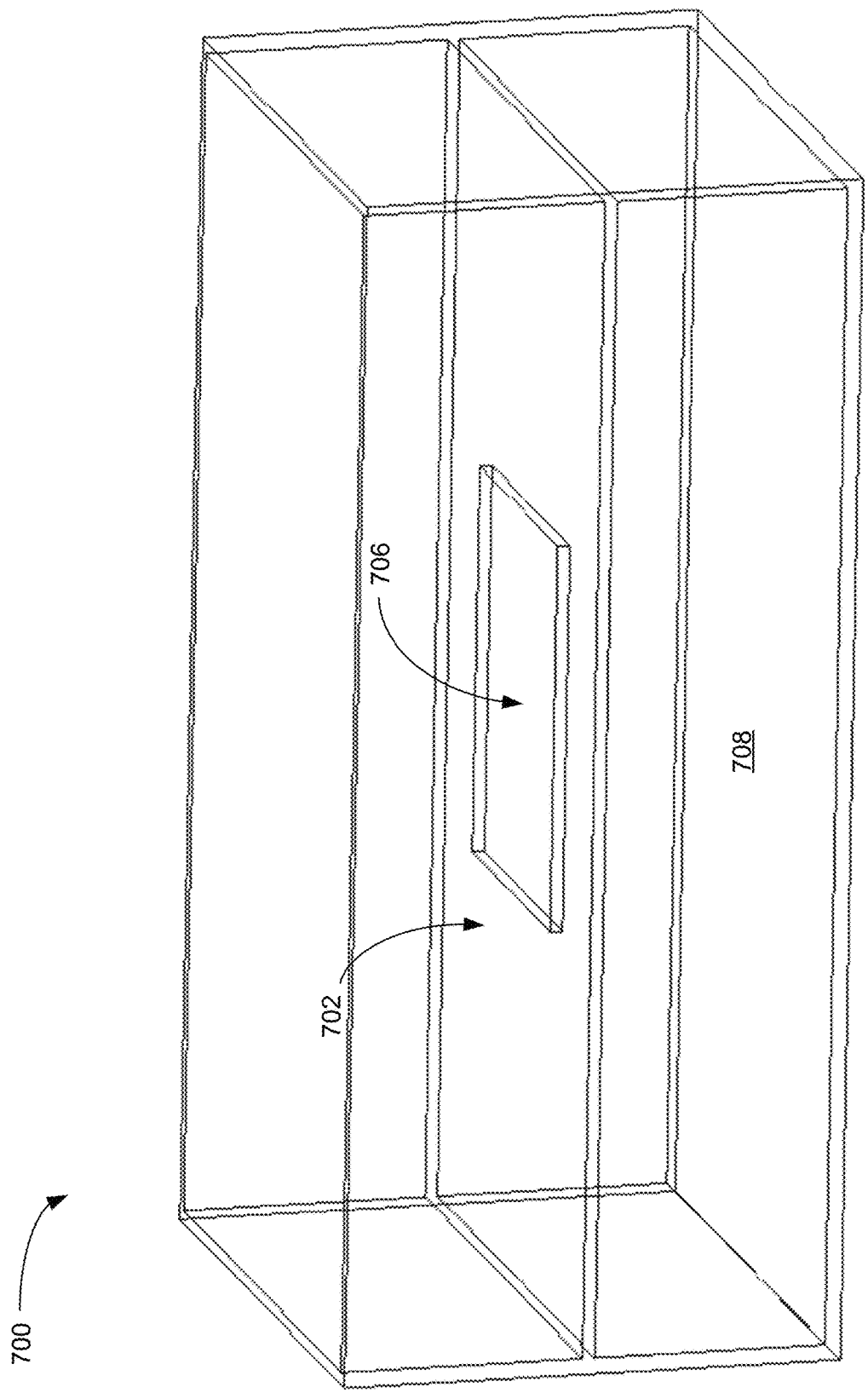
FIG. 7 is a perspective view schematically illustrating an example of a fluid container with baffles surrounding an opening for the fluid such as oil to flow into a tank.

FIG. 7 is a perspective view schematically illustrating an example of a fluid container 700 with baffles 702 surrounding an opening 706 for the fluid in a fluid reservoir 708 such as oil to flow into a tank. The baffles are horizontal baffles 702 when the vessel and the container 700 are level. The baffles 702 prevent the fluid such as oil in the fluid reservoir 708 from rising up the sides of the sump or container 700 as the vessel rolls causing the fluid container 700 to rotate in roll. This will keep more oil lower in the sump and near the center, allowing the suction point 706 to remain submerged at higher inclinations. This baffle configuration may be achieved by incorporating fixed plates oriented horizontally around the perimeter of the sump.

This design utilizes minimal additional material and introduces no moving parts. It can be incorporated in various sump geometries and possible suction methods such as those described above. This design also has a possibility to increase the angles of pitch a vessel can sustain.

Figure 8:
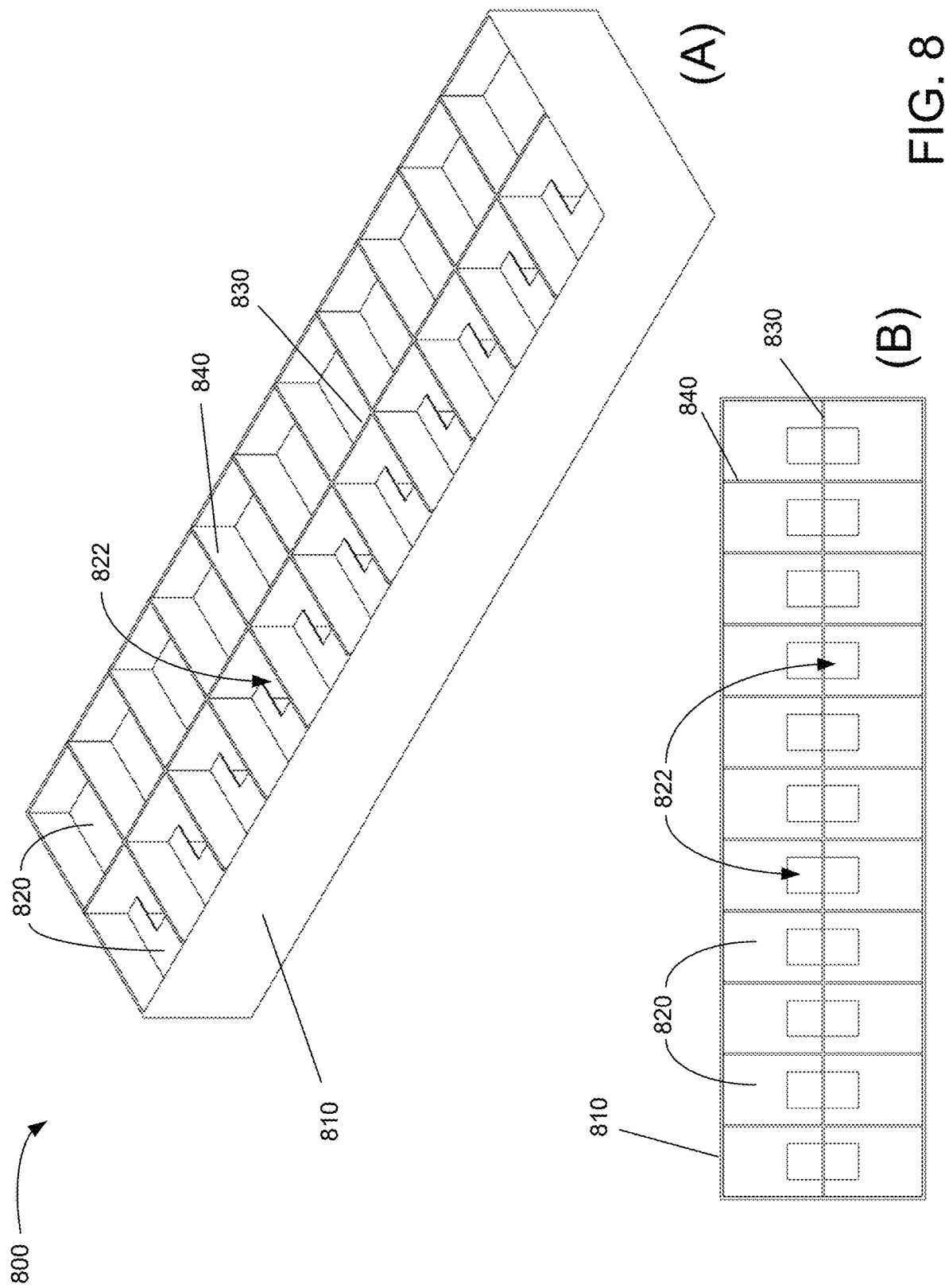
FIG. 8 shows an example of the horizontal baffle design configuration including (A) a perspective view, (B) a top plan view, (C) an elevational view, and (D) a sectional view along section A-A.
Figure 8:
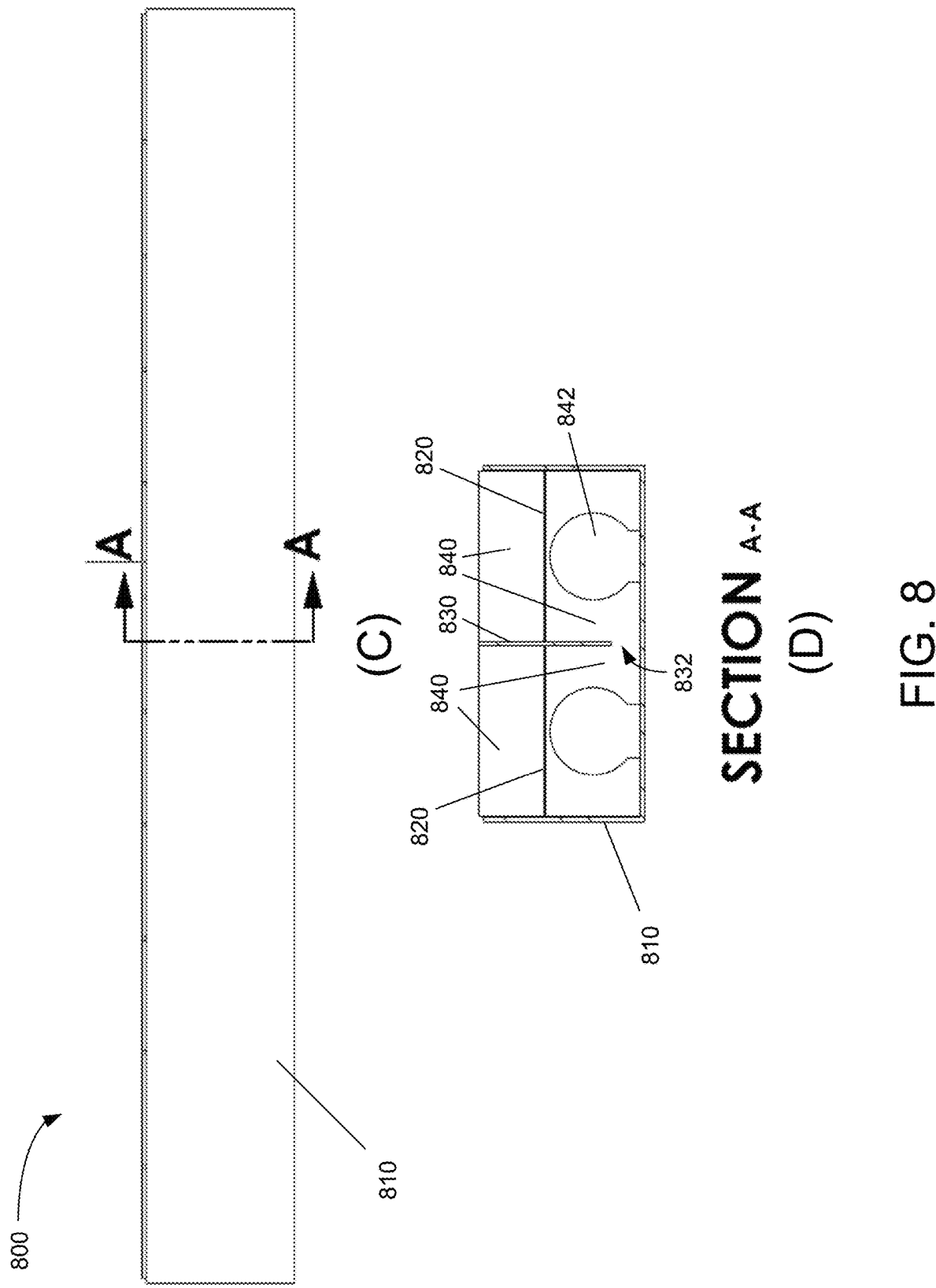

FIG. 8 shows an example of the horizontal baffle design configuration 800 including (A) a perspective view, (B) a top plan view, (C) an elevational view, and (D) a sectional view along section A-A. The container or sump 810 includes horizontal baffles 820 with horizontal openings 822 and vertical baffles 830, 840 which compartmentalize the sump 810 vertically. The vertical baffles may include first vertical baffles or longitudinal baffles 830 and second vertical baffles or transverse baffles 840. The first vertical baffles 830 extend across the upper portion of the container 810 leaving lower openings 832 below the horizontal baffles 820. The first vertical baffles 830 may have a generally straight lower edge to define generally rectangular lower openings 832. The second vertical baffles 840 may include different openings. FIG. 8 shows in view (D) shows second vertical baffles 840 that extend all the way to the bottom of the sump 810. At least some of the second vertical baffles 840 may include generally circular openings 842 extending from the bottom of the sump 810.

The actual MAN B&W engine sump 810 has vertical baffles 830, 840 that prevent fore-aft sloshing of the lube oil. The expectation is that as the ship rolls, the horizontal baffle 820 will prevent the oil from running up the bulkhead of the sump. Therefore, the lube oil will be concentrated at the bottom of the sump 810 near the suction point for the lubrication system and will allow the ship to maintain lubrication at increased inclination angles. The prototype of the horizontal baffle 820 was fabricated from a ¼-inch acrylic sheet properly spaced to drop into the test sump. The horizontal baffle prototype is designed to rest on top of the transverse baffles already in the sump.

The horizontal baffle prototype was tested in the sump using water as the working fluid. The test sump was rolled from side to side to simulate the static list and dynamic roll of interest in this disclosure. As a result, the horizontal baffle 820 performed as expected by preventing large amounts of water from traveling up the side of the bulkheads as the sump rolled.

The horizontal baffle 820 also compartmentalized the oil sump and prevented excessive sloshing from the rolling motion. There was a small amount of water that moved past the baffle at the point where it meets the bulkhead of the sump due to improper sealing. This can be managed by adding silicone to seal that junction for the prototype and welding the baffle in the actual oil sump.

The horizontal baffle design may be combined with the other designs described in this disclosure to achieve the final product. Another section of the baffle can be cut out so the pivoting suction piping can move side to side through the sump as the ship rolls. This section cut out 842 of the baffle should not severely impact the functionality of the baffle. Similarly, two holes can be cut out of the baffle for the two suction pipes extending into the sump so that the baffle can still perform its function.

For the embodiments shown in FIG. 3 and FIG. 6, one or more baffles may partially cover a surface of the fluid reservoir of the container without contact interference with the first suction pipe (302, 602) and the second suction pipe (304, 604) as the first suction pipe and the second suction pipe move with the vessel in rolling motion.

Altered Tank Geometry

Figure 9:
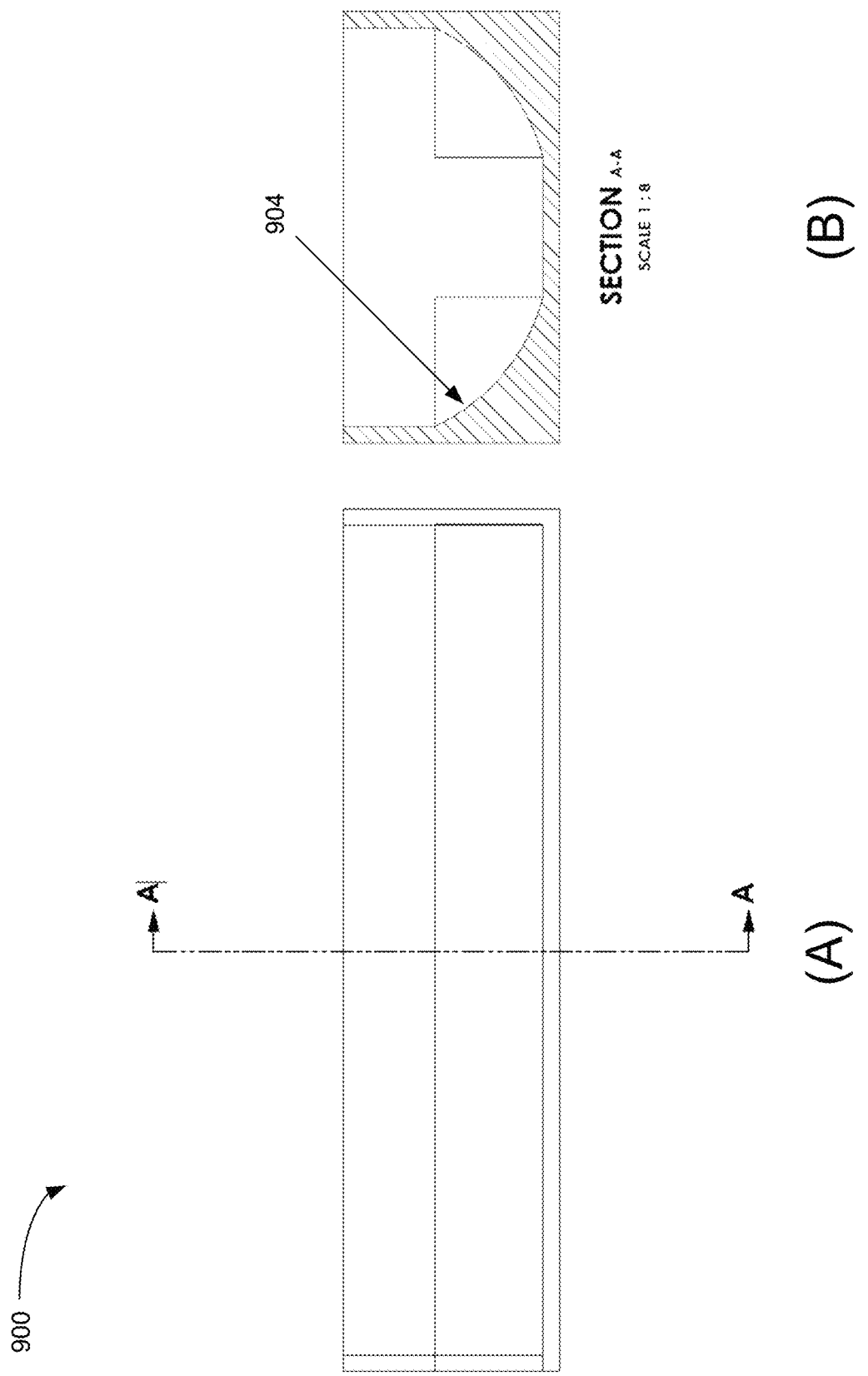
FIG. 9 shows an example of an altered tank geometry for a tank or container containing the reservoir of fluid such as oil, including (A) an elevational view and (B) a sectional view along section A-A.

FIG. 9 shows an example of an altered tank geometry for a tank or container containing the reservoir of fluid such as oil, including (A) an elevational view and (B) a sectional view along section A-A. The altered tank 900 has rounded lower outboard edges 904. By rounding the lower outboard edges of the sump, oil can be concentrated nearer the center of the sump. This will ensure more oil is available for a single center suction point. If rounded with the proper geometry, this will allow the swinging trunk suction or pivoting suction (see, e.g., the intake opening 122 at the distal end of the suction pipe 120 of FIG. 1) to remain at an even or a constant distance from the rounded sump bottom 904 as it rotates, or at least a more even distance from the rounded sump bottom as opposed to a flat bottom.

For the embodiments shown in FIG. 3 and FIG. 6, the rounded interior bottom 904 of the container may be spaced from the first intake opening (312, 612) of the first suction pipe (302, 602) by a first substantially even distance (e.g., within 10% or within 5% of a constant distance) as the first suction pipe moves with the vessel in rolling motion and to be spaced from the second intake opening (314, 614) of the second suction pipe (304, 604) by a second substantially even distance as the second suction pipe moves with the vessel in rolling motion. The first substantially even distance may be equal to the second substantially even distance.

The altered tank geometry design may require significant retrofit processes and may significantly reduce the oil storage volume of the sump. The benefits will need to be weighed against the costs. For new construction instead of retrofit construction, the benefits may be more favorable against the costs.

Prototype Test Results

Prototype testing showed promising results. The swinging trunk or pivoting suction (FIGS. 1 and 2) has been shown to maintain suction at elevated angles of list and roll while introducing minimal air into the oil supply. The gravity-actuated valve device (FIGS. 3-5) has been shown to maintain suction for short periods of time while one suction point is no longer submerged in oil, although this suction is not maintained indefinitely. As such, a significant amount of air may be introduced into the oil supply through the valve body. The horizontal baffle (FIGS. 7 and 8) has been shown to limit the ability of oil to rise up the sides of the sump as the vessel inclines, which will increase the amount of oil available to either suction design (i.e., swinging trunk suction or gravity-actuated valve device).

FIG. 10 shows (A) a graph of existing fixed sump performance during a roll cycle and (B) a graph of the pivoting suction prototype performance over a roll period. The lube oil pressure of the existing fixed sump varies greatly as a function of time. The minimum pressure and the maximum pressure differ from one another by an order of magnitude, as seen in view (A) of FIG. 10. In contrast, the pivoting suction prototype produces lube oil pressure that is substantially more constant (e.g., ±15%). The consistency in lube oil pressure can be maintained for an extended period of time. FIG. 10 shows the consistency over a roll period in view (B).

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

The inventive concepts taught by way of the examples discussed above are amenable to modification, rearrangement, and embodiment in several ways. For example, this invention may be applicable in other environments not involving machinery lubrication. The shapes and sizes of the various parts of the fluid transportation apparatus may be modified while maintaining their functional aspects. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A fluid transportation method for a vessel in rolling motion around a pivoting axis, the fluid transportation method comprising:

attaching a first suction pipe to the vessel to move with the vessel in rolling motion, the first suction pipe having a first proximal end and a first distal end, the first distal end having a first intake opening configured to be submerged in a fluid reservoir of a fluid in a container to take in the fluid and transport the fluid through the first suction pipe out through the first proximal end;

attaching a second suction pipe to the vessel to move with the vessel in rolling motion, the second suction pipe having a second proximal end and a second distal end, the second distal end having a second intake opening configured to be submerged in the fluid reservoir in the container to take in the fluid and transport the fluid through the second suction pipe out through the second proximal end; the first suction pipe and the second suction pipe being attached to the vessel on opposite sides of a vertical plane that passes through the pivoting axis of the rolling motion to move with the vessel in rolling motion, the first intake opening being disposed in the fluid reservoir at a position lower than the second intake opening as the first suction pipe and the second suction pipe move with the vessel in a first rolling direction of the rolling motion, and the second intake opening being disposed in the fluid reservoir at a position lower than the first intake opening as the first suction pipe and the second suction pipe move with the vessel in a second rolling direction of the rolling motion opposite from the first rolling direction;

coupling a valve device to the first proximal end of the first suction pipe and the second proximal end of the second suction pipe, the valve device moving toward a maximally opened position for the first proximal end of the first suction pipe and to move toward a maximally closed position for the second proximal end of the second suction pipe as the first suction pipe and the second suction pipe move with the vessel in the first rolling direction of the rolling motion, the valve device moving toward a maximally opened position for the second proximal end of the second suction pipe and moving toward to a maximally closed position for the first proximal end of the first suction pipe as the first suction pipe and the second suction pipe move with the vessel in the second rolling direction of the rolling motion;

coupling a first one-way valve with the first distal end of the first suction pipe to allow one-way flow from the first distal end to the first proximal end; and coupling a second one-way valve with the second distal end of the second suction pipe to allow one-way flow from the second distal end to the second proximal end.

2. A fluid transportation method for a vessel in rolling motion around a pivoting axis, the fluid transportation method comprising:

attaching a first suction pipe to the vessel to move with the vessel in rolling motion, the first suction pipe having a first proximal end and a first distal end, the first distal end having a first intake opening configured to be submerged in a fluid reservoir of a fluid in a container to take in the fluid and transport the fluid through the first suction pipe out through the first proximal end;

attaching a second suction pipe to the vessel to move with the vessel in rolling motion, the second suction pipe having a second proximal end and a second distal end, the second distal end having a second intake opening configured to be submerged in the fluid reservoir in the container to take in the fluid and transport the fluid through the second suction pipe out through the second proximal end; the first suction pipe and the second suction pipe being attached to the vessel on opposite sides of a vertical plane that passes through the pivoting axis of the rolling motion to move with the vessel in rolling motion, the first intake opening being disposed in the fluid reservoir at a position lower than the second intake opening as the first suction pipe and the second suction pipe move with the vessel in a first rolling direction of the rolling motion, and the second intake opening being disposed in the fluid reservoir at a position lower than the first intake opening as the first suction pipe and the second suction pipe move with the vessel in a second rolling direction of the rolling motion opposite from the first rolling direction; and coupling a valve device to the first proximal end of the first suction pipe and the second proximal end of the second suction pipe, the valve device moving toward a maximally opened position for the first proximal end of the first suction pipe and to move toward a maximally closed position for the second proximal end of the second suction pipe as the first suction pipe and the second suction pipe move with the vessel in the first rolling direction of the rolling motion, the valve device moving toward a maximally opened position for the second proximal end of the second suction pipe and moving toward to a maximally closed position for the first proximal end of the first suction pipe as the first suction pipe and the second suction pipe move with the vessel in the second rolling direction of the rolling motion, wherein coupling the valve device comprises:

connecting a valve housing to the first suction pipe and the second suction pipe to move with the vessel in rolling motion, the valve housing having a first valve inlet connected with the first proximal end of the first suction pipe, a second valve inlet connected with the second proximal end of the second suction pipe, and a valve outlet;

disposing a valve member inside the valve housing to be rotatable relative to the valve housing in the first rolling direction and the second rolling direction; and connecting the valve member to a weight to maintain a bottom location of the valve member at a lowest elevation when the valve housing moves with the vessel in rolling motion, the valve member including a first valve inlet blocking member which moves relative to the valve housing toward a first blocking position maximally blocking the first valve inlet as the valve housing moves with the vessel in the second rolling direction of the rolling motion, the valve member including a second valve inlet blocking member which moves relative to the valve housing toward a second blocking position maximally blocking the second valve inlet as the valve housing moves with the vessel in the first rolling direction of the rolling motion.

3. The fluid transportation method of claim 2, wherein connecting the valve member to the weight comprises:

connecting the weight to the valve member via a pendulum which remains vertical under gravity as the valve housing moves with the vessel in rolling motion, the pendulum and the valve member having a common center of rotation in the first rolling direction and the second rolling direction.

4. The fluid transportation method of claim 2, wherein the valve housing has a circular cylindrical hollow interior, and wherein disposing the valve member inside the valve housing comprises:

inserting the valve member in the circular cylindrical hollow interior, the valve member having a circular cylindrical valve member body to rotate relative to the valve housing in the first rolling direction and the second rolling direction, the first valve inlet blocking member being disposed along a periphery of the circular cylindrical valve member body and being sized to fully block the first valve inlet in the first blocking position as the valve housing moves with the vessel in the second rolling direction, the second valve inlet blocking member being disposed along the periphery of the circular cylindrical valve member body and being sized to fully block the second valve inlet in the second blocking position as the valve housing moves with the vessel in the first rolling direction.

5. The fluid transportation method of claim 2, attaching the container to the vessel to move with the vessel in rolling motion.

6. The fluid transportation method of claim 2, further comprising:
  partially covering a surface of the fluid reservoir of the container using baffles without contact interference with the first suction pipe and the second suction pipe as the first suction pipe and the second suction pipe move with the vessel in rolling motion.

7. A fluid transportation method for a vessel in rolling motion around a pivoting axis, the fluid transportation method comprising:
  attaching a first suction pipe to the vessel to move with the vessel in rolling motion, the first suction pipe having a first proximal end and a first distal end, the first distal end having a first intake opening configured to be submerged in a fluid reservoir of a fluid in a container to take in the fluid and transport the fluid through the first suction pipe out through the first proximal end;
  attaching a second suction pipe to the vessel to move with the vessel in rolling motion, the second suction pipe having a second proximal end and a second distal end, the second distal end having a second intake opening configured to be submerged in the fluid reservoir in the container to take in the fluid and transport the fluid through the second suction pipe out through the second proximal end; the first suction pipe and the second suction pipe being attached to the vessel on opposite sides of a vertical plane that passes through the pivoting axis of the rolling motion to move with the vessel in rolling motion, the first intake opening being disposed in the fluid reservoir at a position lower than the second intake opening as the first suction pipe and the second suction pipe move with the vessel in a first rolling direction of the rolling motion, and the second intake opening being disposed in the fluid reservoir at a position lower than the first intake opening as the first suction pipe and the second suction pipe move with the vessel in a second rolling direction of the rolling motion opposite from the first rolling direction; and
  coupling a valve device to the first proximal end of the first suction pipe and the second proximal end of the second suction pipe, the valve device moving toward a maximally opened position for the first proximal end of the first suction pipe and to move toward a maximally closed position for the second proximal end of the second suction pipe as the first suction pipe and the second suction pipe move with the vessel in the first rolling direction of the rolling motion, the valve device moving toward a maximally opened position for the second proximal end of the second suction pipe and moving toward to a maximally closed position for the first proximal end of the first suction pipe as the first suction pipe and the second suction pipe move with the vessel in the second rolling direction of the rolling motion, wherein coupling the valve device comprises:
  disposing a first electronically actuated valve in a flow path of the first suction pipe, the first electronically actuated valve being electronically actuated to move toward an opened position as the first suction pipe and the second suction pipe move with the vessel in the first rolling direction of the rolling motion, the first electronically actuated valve being electronically actuated to move toward a closed position as the first suction pipe and the second suction pipe move with the vessel in the second rolling direction of the rolling motion; and
  disposing a second electronically actuated valve in a flow path of the second suction pipe, the second electronically actuated valve being electronically actuated to move toward an opened position as the first suction pipe and the second suction pipe move with the vessel in the second rolling direction of the rolling motion, the second electronically actuated valve being electronically actuated to move toward a closed position as the first suction pipe and the second suction pipe move with the vessel in the first rolling direction of the rolling motion.

8. The fluid transportation method of claim 7, further comprising:
  controlling electronic actuation of the first electronically actuated valve to move between the opened position and the closed position based on first sensing information and to control the second electronically actuated valve between the opened position and the closed position based on second sensing information;
  the first sensing information including at least one of an angle of rolling motion or a fluid level of the fluid reservoir with respect to the first intake opening of the first suction pipe; and
  the second sensing information including at least one of the angle of rolling motion or the fluid level of the fluid reservoir with respect to the second intake opening of the second suction pipe.

9. The fluid transportation method of claim 8, further comprising:
  receiving the first sensing information and the second sensing information from at least one of an inclination sensor to sense the angle of rolling motion or a level sensor to sense the fluid level of the fluid reservoir with respect to the first intake opening of the first suction pipe and with respect to the second intake opening of the second suction pipe.

10. A fluid transportation apparatus for a vessel to move in rolling motion around a pivoting axis, the fluid transportation apparatus comprising:
  a container configured to contain a fluid reservoir of a fluid;
  a first suction pipe having a first proximal end and a first distal end, the first distal end having a first intake opening configured to be submerged in the fluid reservoir in the container to take in the fluid and transport the fluid through the first suction pipe out through the first proximal end;
  a second suction pipe having a second proximal end and a second distal end, the second distal end having a second intake opening configured to be submerged in the fluid reservoir in the container to take in the fluid and transport the fluid through the second suction pipe out through the second proximal end; the first suction pipe and the second suction pipe being attached to the vessel on opposite sides of a vertical plane that passes through the pivoting axis of the rolling motion to move with the vessel in rolling motion, the first intake opening being disposed in the fluid reservoir at a position lower than the second intake opening as the first suction pipe and the second suction pipe move with the vessel in a first rolling direction of the rolling motion, and the second intake opening being disposed in the fluid reservoir at a position lower than the first intake opening as the first suction pipe and the second suction pipe move with the vessel in a second rolling direction of the rolling motion opposite from the first rolling direction;
  a valve device coupled to the first proximal end of the first suction pipe and the second proximal end of the second suction pipe, the valve device being configured to move toward a maximally opened position for the first proximal end of the first suction pipe and to move toward a maximally closed position for the second proximal end of the second suction pipe as the first suction pipe and the second suction pipe move with the vessel in the first rolling direction of the rolling motion, the valve device being configured to move toward a maximally opened position for the second proximal end of the second suction pipe and to move toward a maximally closed position for the first proximal end of the first suction pipe as the first suction pipe and the second suction pipe move with the vessel in the second rolling direction of the rolling motion;
a first one-way valve coupled with the first distal end of the first suction pipe to allow one-way flow from the first distal end to the first proximal end; and
a second one-way valve coupled with the second distal end of the second suction pipe to allow one-way flow from the second distal end to the second proximal end.

11. The fluid transportation apparatus of claim 10, wherein the valve device comprises:
a valve housing having a first valve inlet connected with the first proximal end of the first suction pipe, a second valve inlet connected with the second proximal end of the second suction pipe, and a valve outlet, the valve housing being connected to the first suction pipe and the second suction pipe to move with the vessel in rolling motion; and
a valve member disposed inside the valve housing and rotatable relative to the valve housing in the first rolling direction and the second rolling direction, the valve member being connected to a weight to maintain a bottom location of the valve member at a lowest elevation when the valve housing moves with the vessel in rolling motion, the valve member including a first valve inlet blocking member which moves relative to the valve housing toward a first blocking position maximally blocking the first valve inlet as the valve housing moves with the vessel in the second rolling direction of the rolling motion, the valve member including a second valve inlet blocking member which moves relative to the valve housing toward a second blocking position maximally blocking the second valve inlet as the valve housing moves with the vessel in the first rolling direction of the rolling motion.

12. The fluid transportation apparatus of claim 10, wherein the valve device comprises:
a first electronically actuated valve disposed in a flow path of the first suction pipe, the first electronically actuated valve being electronically actuated to move toward an opened position as the first suction pipe and the second suction pipe move with the vessel in the first rolling direction of the rolling motion, the first electronically actuated valve being electronically actuated to move toward a closed position as the first suction pipe and the second suction pipe move with the vessel in the second rolling direction of the rolling motion; and
a second electronically actuated valve disposed in a flow path of the second suction pipe, the second electronically actuated valve being electronically actuated to move toward an opened position as the first suction pipe and the second suction pipe move with the vessel in the second rolling direction of the rolling motion, the second electronically actuated valve being electronically actuated to move toward a closed position as the first suction pipe and the second suction pipe move with the vessel in the first rolling direction of the rolling motion.

13. The fluid transportation apparatus of claim 10, wherein the container has a rounded interior bottom to be spaced from the first intake opening of the first suction pipe by a first substantially even distance as the first suction pipe moves with the vessel in rolling motion and to be spaced from the second intake opening of the second suction pipe by a second substantially even distance as the second suction pipe moves with the vessel in rolling motion.

14. The fluid transportation apparatus of claim 10, wherein the container is attached to the vessel to move with the vessel in rolling motion.

15. The fluid transportation apparatus of claim 10, further comprising:
one or more baffles partially covering a surface of the fluid reservoir of the container without contact interference with the first suction pipe and the second suction pipe as the first suction pipe and the second suction pipe move with the vessel in rolling motion.

16. A fluid transportation apparatus for a vessel to move in rolling motion around a pivoting axis, the fluid transportation apparatus comprising:
a container configured to contain a fluid reservoir of a fluid;
a first suction pipe having a first proximal end and a first distal end, the first distal end having a first intake opening configured to be submerged in the fluid reservoir in the container to take in the fluid and transport the fluid through the first suction pipe out through the first proximal end;
a second suction pipe having a second proximal end and a second distal end, the second distal end having a second intake opening configured to be submerged in the fluid reservoir in the container to take in the fluid and transport the fluid through the second suction pipe out through the second proximal end; the first suction pipe and the second suction pipe being attached to the vessel on opposite sides of a vertical plane that passes through the pivoting axis of the rolling motion to move with the vessel in rolling motion, the first intake opening being disposed in the fluid reservoir at a position lower than the second intake opening as the first suction pipe and the second suction pipe move with the vessel in a first rolling direction of the rolling motion, and the second intake opening being disposed in the fluid reservoir at a position lower than the first intake opening as the first suction pipe and the second suction pipe move with the vessel in a second rolling direction of the rolling motion opposite from the first rolling direction; and
a valve device coupled to the first proximal end of the first suction pipe and the second proximal end of the second suction pipe, the valve device being configured to move toward a maximally opened position for the first proximal end of the first suction pipe and to move toward a maximally closed position for the second proximal end of the second suction pipe as the first suction pipe and the second suction pipe move with the vessel in the first rolling direction of the rolling motion, the valve device being configured to move toward a maximally opened position for the second proximal end of the second suction pipe and to move toward a maximally closed position for the first proximal end of the first suction pipe as the first suction pipe and the second suction pipe move with the vessel in the second rolling direction of the rolling motion, wherein the valve device comprises:
a valve housing having a first valve inlet connected with the first proximal end of the first suction pipe, a second valve inlet connected with the second proximal end of the second suction pipe, and a valve outlet, the valve housing being connected to the first suction pipe and the second suction pipe to move with the vessel in rolling motion; and
a valve member disposed inside the valve housing and rotatable relative to the valve housing in the first rolling direction and the second rolling direction, the valve member being connected to a weight to maintain a bottom location of the valve member at a lowest elevation when the valve housing moves with the vessel in rolling motion, the valve member including a first valve inlet blocking member which moves relative to the valve housing toward a first blocking position maximally blocking the first valve inlet as the valve housing moves with the vessel in the second rolling direction of the rolling motion, the valve member including a second valve inlet blocking member which moves relative to the valve housing toward a second blocking position maximally blocking the second valve inlet as the valve housing moves with the vessel in the first rolling direction of the rolling motion.

17. The fluid transportation apparatus of claim 16, wherein the weight connected to the valve member comprises a pendulum which remains vertical under gravity as the valve housing moves with the vessel in rolling motion, the pendulum and the valve member having a common center of rotation in the first rolling direction and the second rolling direction.

18. The fluid transportation apparatus of claim 16, wherein the valve housing has a circular cylindrical hollow interior; and
wherein the valve member is disposed in the circular cylindrical hollow interior and has a circular cylindrical valve member body to rotate relative to the valve housing in the first rolling direction and the second rolling direction, the first valve inlet blocking member being disposed along a periphery of the circular cylindrical valve member body and being sized to fully block the first valve inlet in the first blocking position as the valve housing moves with the vessel in the second rolling direction, the second valve inlet blocking member being disposed along the periphery of the circular cylindrical valve member body and being sized to fully block the second valve inlet in the second blocking position as the valve housing moves with the vessel in the first rolling direction.

19. The fluid transportation apparatus of claim 16, wherein the container has a rounded interior bottom to be spaced from the first intake opening of the first suction pipe by a first substantially even distance as the first suction pipe moves with the vessel in rolling motion and to be spaced from the second intake opening of the second suction pipe by a second substantially even distance as the second suction pipe moves with the vessel in rolling motion.

20. The fluid transportation apparatus of claim 16, wherein the container is attached to the vessel to move with the vessel in rolling motion.

21. The fluid transportation apparatus of claim 16, further comprising:
one or more baffles partially covering a surface of the fluid reservoir of the container without contact interference with the first suction pipe and the second suction pipe as the first suction pipe and the second suction pipe move with the vessel in rolling motion.

22. A fluid transportation apparatus for a vessel to move in rolling motion around a pivoting axis, the fluid transportation apparatus comprising:
a container configured to contain a fluid reservoir of a fluid;
a first suction pipe having a first proximal end and a first distal end, the first distal end having a first intake opening configured to be submerged in the fluid reservoir in the container to take in the fluid and transport the fluid through the first suction pipe out through the first proximal end;
a second suction pipe having a second proximal end and a second distal end, the second distal end having a second intake opening configured to be submerged in the fluid reservoir in the container to take in the fluid and transport the fluid through the second suction pipe out through the second proximal end; the first suction pipe and the second suction pipe being attached to the vessel on opposite sides of a vertical plane that passes through the pivoting axis of the rolling motion to move with the vessel in rolling motion, the first intake opening being disposed in the fluid reservoir at a position lower than the second intake opening as the first suction pipe and the second suction pipe move with the vessel in a first rolling direction of the rolling motion, and the second intake opening being disposed in the fluid reservoir at a position lower than the first intake opening as the first suction pipe and the second suction pipe move with the vessel in a second rolling direction of the rolling motion opposite from the first rolling direction; and
a valve device coupled to the first proximal end of the first suction pipe and the second proximal end of the second suction pipe, the valve device being configured to move toward a maximally opened position for the first proximal end of the first suction pipe and to move toward a maximally closed position for the second proximal end of the second suction pipe as the first suction pipe and the second suction pipe move with the vessel in the first rolling direction of the rolling motion, the valve device being configured to move toward a maximally opened position for the second proximal end of the second suction pipe and to move toward a maximally closed position for the first proximal end of the first suction pipe as the first suction pipe and the second suction pipe move with the vessel in the second rolling direction of the rolling motion, wherein the valve device comprises:
a first electronically actuated valve disposed in a flow path of the first suction pipe, the first electronically actuated valve being electronically actuated to move toward an opened position as the first suction pipe and the second suction pipe move with the vessel in the first rolling direction of the rolling motion, the first electronically actuated valve being electronically actuated to move toward a closed position as the first suction pipe and the second suction pipe move with the vessel in the second rolling direction of the rolling motion; and
a second electronically actuated valve disposed in a flow path of the second suction pipe, the second electronically actuated valve being electronically actuated to move toward an opened position as the first suction pipe and the second suction pipe move with the vessel in the second rolling direction of the rolling motion, the second electronically actuated valve being electronically actuated to move toward a closed position as the first suction pipe and the second suction pipe move with the vessel in the first rolling direction of the rolling motion.

23. The fluid transportation apparatus of claim 22, further comprising:
a controller configured to control electronic actuation of the first electronically actuated valve to move between the opened position and the closed position based on first sensing information and to control the second electronically actuated valve between the opened position and the closed position based on second sensing information;
the first sensing information including at least one of an angle of rolling motion or a fluid level of the fluid reservoir with respect to the first intake opening of the first suction pipe; and
the second sensing information including at least one of the angle of rolling motion or the fluid level of the fluid reservoir with respect to the second intake opening of the second suction pipe.

24. The fluid transportation apparatus of claim 23, further comprising:
at least one of an inclination sensor to sense the angle of rolling motion or a level sensor to sense the fluid level of the fluid reservoir with respect to the first intake opening of the first suction pipe and with respect to the second intake opening of the second suction pipe.

* * * * *